US011132378B2

(12) United States Patent
Ponnada et al.

(10) Patent No.: US 11,132,378 B2
(45) Date of Patent: Sep. 28, 2021

(54) SYSTEMS AND METHODS FOR INTERACTIVE ANALYSIS

(71) Applicant: ServiceNow, Inc., Santa Clara, CA (US)

(72) Inventors: Vijaya Krushna Ponnada, Srikakulam (IN); Senthil Premkumar, Hyderabad (IN); Kapil Kumawat, Hyderabad (IN); David van Heusden, Utrecht (NL); Sandip Devjibhai Patel, Amreli (IN); Satyanarayana Kondamuri, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 602 days.

(21) Appl. No.: 15/815,118

(22) Filed: Nov. 16, 2017

(65) Prior Publication Data

US 2019/0147096 A1    May 16, 2019

(51) Int. Cl.
*G06F 16/26*     (2019.01)
*G06F 16/2458*   (2019.01)
*G06F 3/0482*    (2013.01)

(52) U.S. Cl.
CPC .......... *G06F 16/26* (2019.01); *G06F 3/0482* (2013.01); *G06F 16/2465* (2019.01); *G06F 2216/03* (2013.01)

(58) Field of Classification Search
CPC .. G06F 16/2465; G06F 16/26; G06F 2216/03; G06F 3/0482
See application file for complete search history.

(56) References Cited

U.S. PATENT DOCUMENTS

| | | |
|---|---|---|
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,350,209 B2 | 3/2008 | Shum |
| 7,392,300 B2 | 6/2008 | Anantharangachar |
| 7,446,769 B2 | 11/2008 | Molander et al. |
| 7,617,073 B2 | 11/2009 | Trinon |
| 7,685,167 B2 | 3/2010 | Mueller |
| 7,716,353 B2 | 5/2010 | Golovinsky |
| 7,716,592 B2 * | 5/2010 | Tien ............ G06Q 40/00 715/744 |
| 7,769,718 B2 | 8/2010 | Murley |
| 7,890,802 B2 | 2/2011 | Gerber |
| 7,925,981 B2 | 4/2011 | Pourheidari |
| 7,933,927 B2 | 4/2011 | Dee |
| 7,945,860 B2 | 5/2011 | Vambenepe |
| 8,082,222 B2 | 12/2011 | Rangarajan |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,745,040 B2 | 6/2014 | Kowalski |
| 8,812,539 B2 | 8/2014 | Milousheff |

(Continued)

*Primary Examiner* — Miranda Le
(74) *Attorney, Agent, or Firm* — Fletcher Yoder PC

(57) ABSTRACT

Systems and methods for generating and rendering interactive analysis are provided. The interactive analysis includes an incident map and heat map that are dynamically changeable based upon selectable incident attributes, filters, or both.

19 Claims, 31 Drawing Sheets

(56) References Cited

U.S. PATENT DOCUMENTS

| | | |
|---|---|---|
| 8,818,994 B2 | 8/2014 | Kowalski |
| 8,832,652 B2 | 9/2014 | Mueller |
| 9,015,188 B2 | 4/2015 | Behne |
| 9,037,536 B2 | 5/2015 | Vos |
| 9,043,266 B2 | 5/2015 | Bauerle et al. |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,466,050 B2 | 10/2016 | Yee et al. |
| 9,467,344 B2 | 10/2016 | Gere |
| 9,535,737 B2 | 1/2017 | Joy |
| 9,582,171 B2 * | 2/2017 | Pourshahid ........... G06F 3/0482 |
| 9,596,146 B2 * | 3/2017 | Coates ................ G06F 16/903 |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2007/0130541 A1 * | 6/2007 | Louch ................ G06F 3/04817 715/804 |
| 2012/0262472 A1 * | 10/2012 | Garr ..................... G06T 11/206 345/589 |
| 2013/0031041 A1 * | 1/2013 | Maciejewski ........... G06F 17/18 706/46 |
| 2017/0123397 A1 * | 5/2017 | Billi ................ G06Q 10/0639 |
| 2017/0212668 A1 * | 7/2017 | Shah ................ G06F 3/04847 |

* cited by examiner

SYSTEMS AND METHODS FOR INTERACTIVE ANALYSIS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Although the capabilities of computer resources for collecting and storing data continue to expand, the vast amount of collected data has resulted in difficulties with analysis and reporting of the ever-increasing multitude of data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized analysis of such data, enabling predictive forecasting. Further, the current embodiments enable interactivity with this data. The embodiments further provide complex reporting capabilities for the time-series data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion relates to analysis, forecasting, and reporting systems for Information Technology (IT) systems. However, this is not meant to limit the current techniques to IT systems. Indeed, the current techniques may be useful in a number of different contexts. For example the current techniques may be applied to Human Resources (HR) systems or any system that may benefit from the analysis, forecasting, and reporting of data.

Keeping this in mind, the discussion now turns to an Information Technology (IT)-centered example. IT devices are increasingly important in an electronics-driven world in which various electronics devices are interconnected within a distributed context. As more functions are performed by services using some form of distributed computing, the complexity of IT network management increases. As management complexities increase, data analysis, forecasting, and reporting may become more complex.

Figure 1:
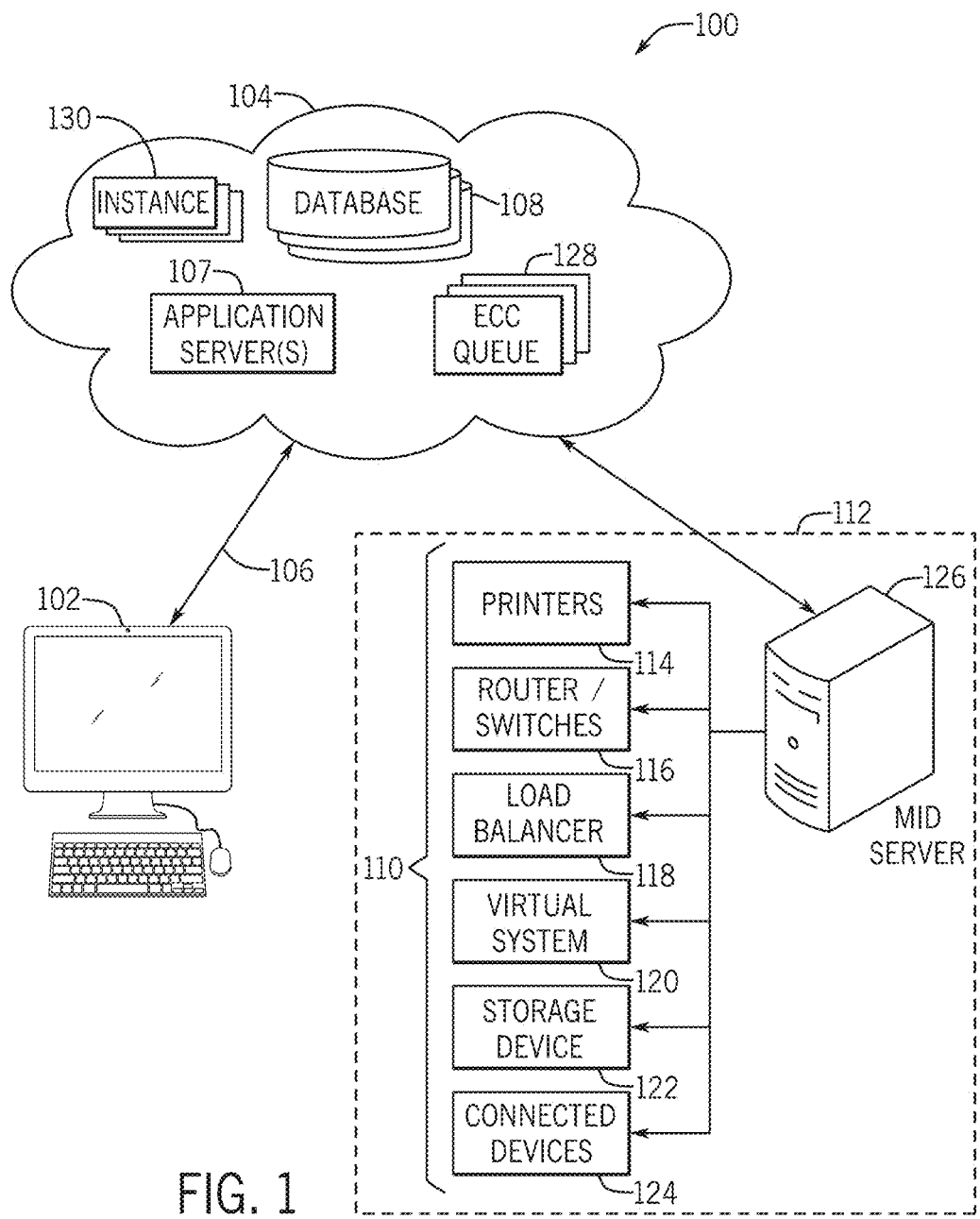
FIG. 1 is a block diagram of a generalized distributed computing system utilizing a cloud service type platform and databases, in accordance with an embodiment.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via an External Communications Channel Queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance 130 running in the platform 104 or a message to the instance from the external system. The fields of an communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs o or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
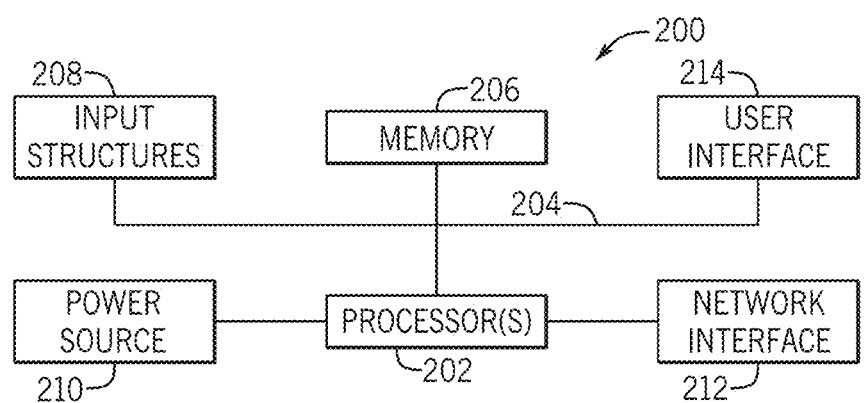
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Homepages and Dashboards

Figure 3:
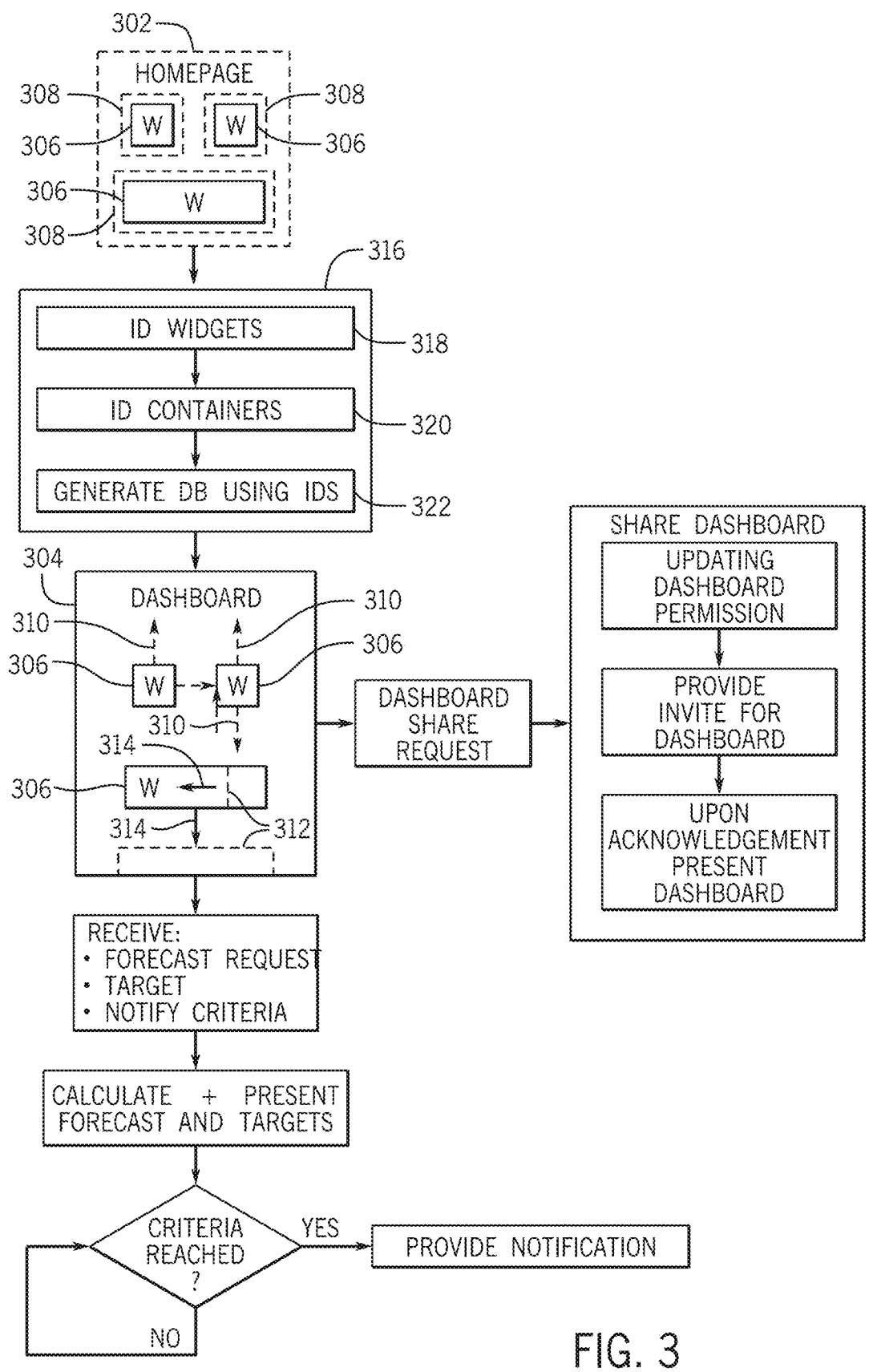
FIG. 3 is a block diagram illustrating performance analytics and reporting features facilitated through a homepage and/or dashboard, in accordance with an embodiment.

The discussion now turns to a mechanism for displaying system data, enabling interactivity with the system data, and reporting on the system data. FIG. 3 is a block diagram illustrating performance analytics and reporting (PAR) features facilitated through a homepage 302 and/or dashboard 304, in accordance with an embodiment. As used herein, a "homepage" refers to a graphical-user-interface (GUI) screen where data-driven widgets 306 may be placed in pre-defined containers 308 that have a static placement and/or size.

In some embodiments, it may be desirable to enable customized positioning and/or sizing of widgets 306. Accordingly, dashboard 304 may be used to provide such features. As used herein, the term "dashboard" refers to a graphical-user-interface (GUI) screen where data-driven widgets 306 may be placed on the screen without being constrained to pre-defined containers 308 and/or static placement and/or size. In other words, for dashboard 304, the widgets 306 may be dynamically moved to any location on the dashboard 304 without being constrained to pre-defined locations, as indicated by arrows 310. Further, the size of the widgets 306 may be dynamically altered in the dashboard 304, as indicated by the sizing indicators 312 and the arrows 314.

Figure 4:
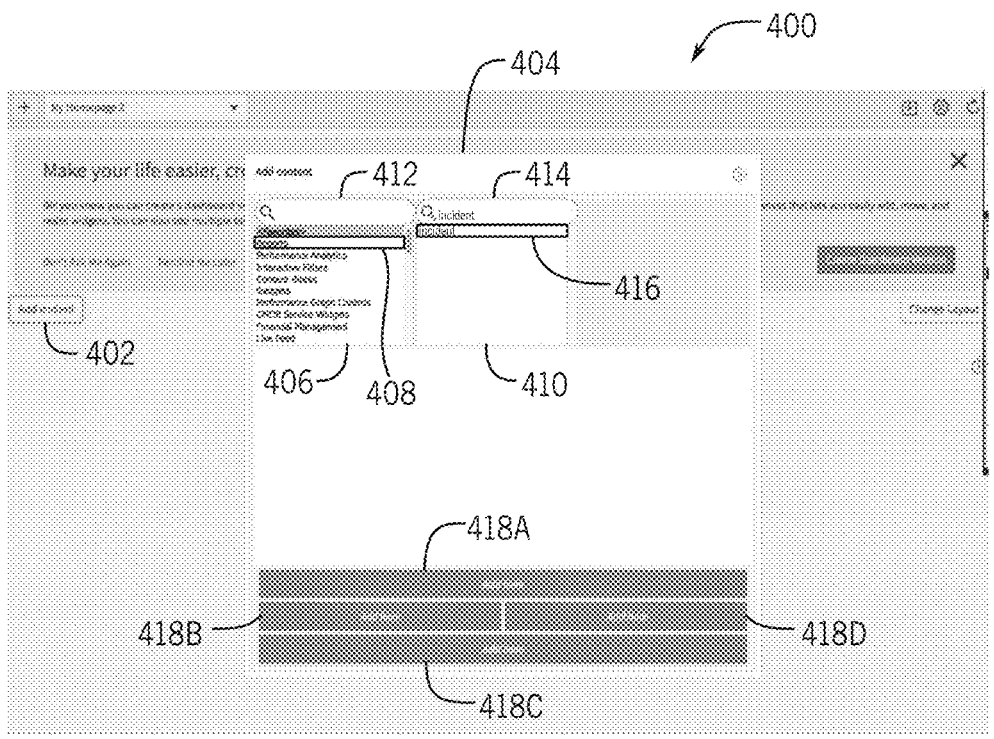
FIG. 4 is an illustration of a graphical-user-interface (GUI) for facilitating generation of analytics and/or reporting widgets on a homepage/dashboard, in accordance with an embodiment.

The widgets 306 may be independent data-driven software that perform particular tasks. For example, the widgets 306 may provide visualizations generated based upon datasets of the system. FIG. 4 is an illustration of a graphical-user-interface (GUI) 400 for facilitating generation of analytics and/or reporting widgets on a homepage/dashboard, in accordance with an embodiment. In the GUI 400, when an indication that new content should be added to the homepage 302 and/or dashboard 304 (e.g., via selection of the "Add content" button 402), a dialog box 404 is presented, enabling selection of particular widgets 306 from a list 406. For example, in FIG. 4, a reports widget selection 408 is selected. Based upon the selection in the list 406, a secondary list 410 may provide selections. In the depicted example, since the reports widget selection 408 was selected, available reports are presented in the secondary list 410.

Figure 5:
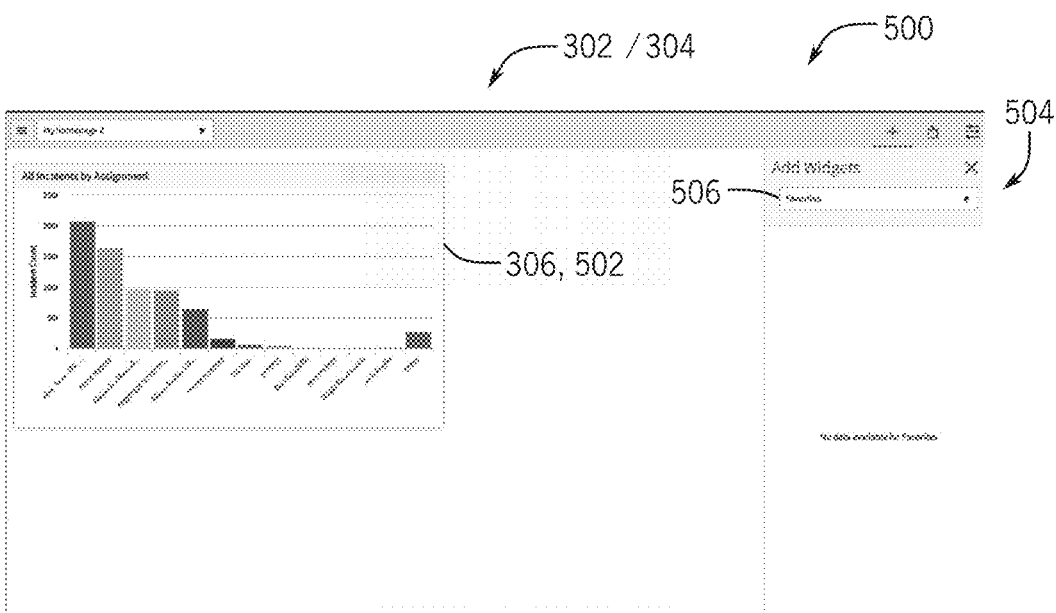
FIG. 5 is an illustration of a GUI for facilitating presentation of generated widgets, in accordance with an embodiment.

The lists 406 and/or 410 may be filtered based upon a text search 412 and/or 414, respectively. For example, in FIG. 4, the term "incident" is entered into text search 414, resulting in one report from the list containing the term "incident." As illustrated, the incident report selection 416 is selected. Upon indication that the selected widget (e.g., the incident report widget) should be added to the homepage 302 and/or dashboard 304 (e.g., via one of the positional "Add here" buttons 418A, B, C, or D), the widget 306 is added to the homepage 302 and/or dashboard 304. For example, FIG. 5 is an illustration of a GUI 500 presenting the widget 306 (e.g., the report widget 502) in a homepage 504, in accordance with an embodiment.

As illustrated, additional widgets 306 may be added via the GUI 500 (e.g., using the add widget sidebar 504. For example, the dropdown list 506 may provide a list of available widgets 306 that may be added to the homepage 302 and/or dashboard 304.

Figure 6:
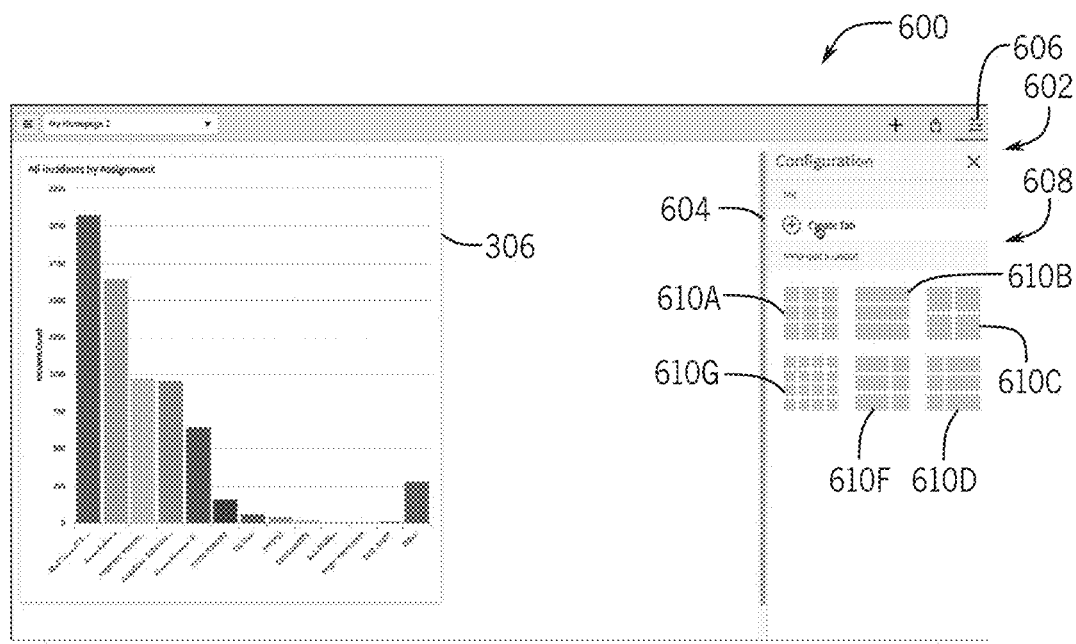
FIG. 6 is an illustration of a GUI for facilitating generation of new tabs in the homepage/dashboard, in accordance with an embodiment.

Additionally, new tabs may be created in a homepage 302 and/or dashboard 304. In FIG. 6, the GUI 600 illustrates a configuration dialog box/sidebar 602, accessed by selecting a configuration icon 606. The configuration dialog box/sidebar 602 includes a "Create Tab" option 604. The "Create Tab" option 604, when selected, generates an additional tab, where additional widgets 306 may be presented. The configuration dialog box/sidebar 602 may also include a "Quick Layout" section 608 including various layout selections (e.g. selections 610A, B, C, D, E, and F) for a layout of the widgets 306. The "Add Widget" icon 612 may result in re-accessing the add widget sidebar 504 of FIG. 5.

Figure 7:
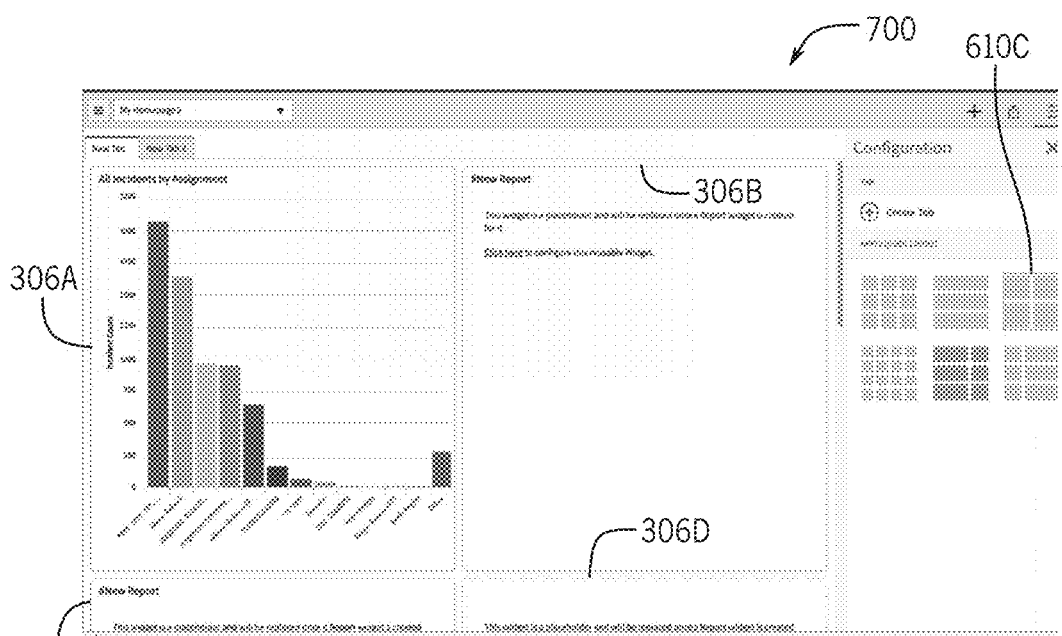
FIG. 7 is an illustration of a GUI for facilitating a layout configuration of the widgets, in accordance with an embodiment.

FIG. 7 is an illustration of a GUI 700 where a new Quick Layout selection 610C is selected after adding new widgets 306A, B, and C to the homepage 302 and/or dashboard 304, in accordance with an embodiment. As illustrated, the quadrant layout (e.g., selection 610C) is selected, resulting in arrangement of the four widgets 306A, 306B, 306C, and 306D with equal sizes in four quadrants of the homepage 302 and/or dashboard 304.

Figure 8:
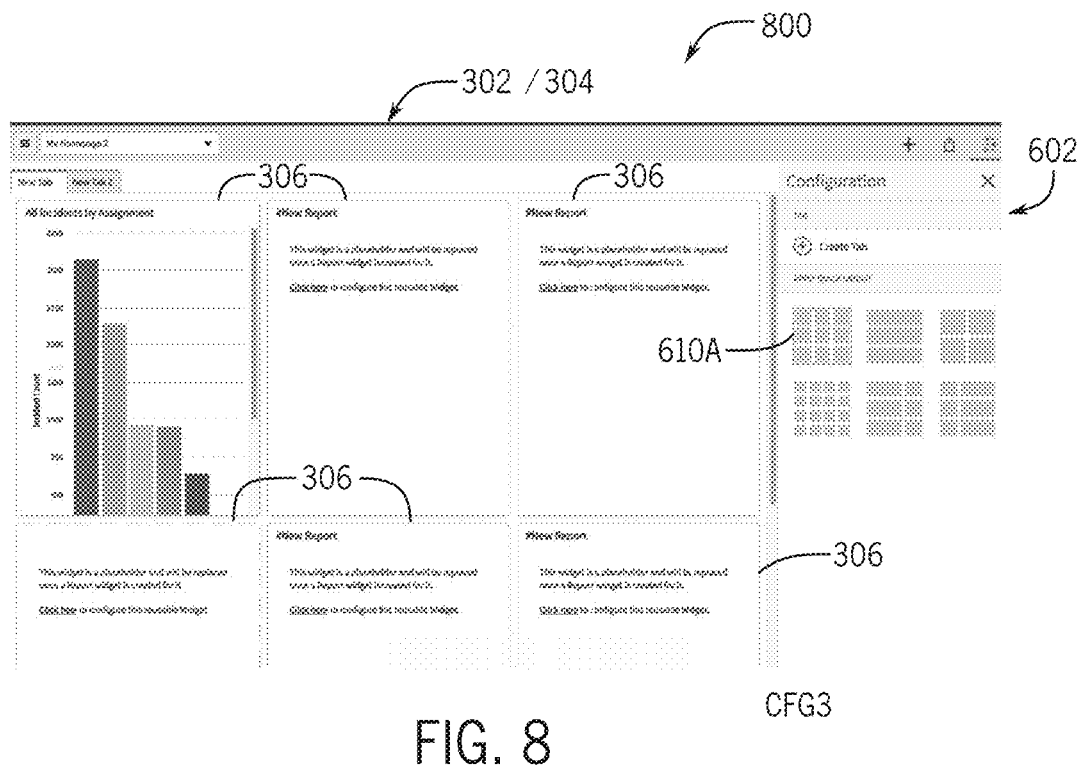
FIG. 8 is an illustration of a GUI for facilitating a modified layout, in accordance with an embodiment.

In FIG. 8, the GUI 800 illustrates a modified layout, in accordance with an embodiment. In the modified layout, selection 610A is selected, resulting in nine widgets displayed on the homepage 302 and/or dashboard 304. When the addition of new widgets 306 and configuration of the homepage 302 and/or dashboard 304 is complete, the configuration dialog box/sidebar 602 may be closed, resulting in a configured homepage 302/dashboard 304.

Figure 9:
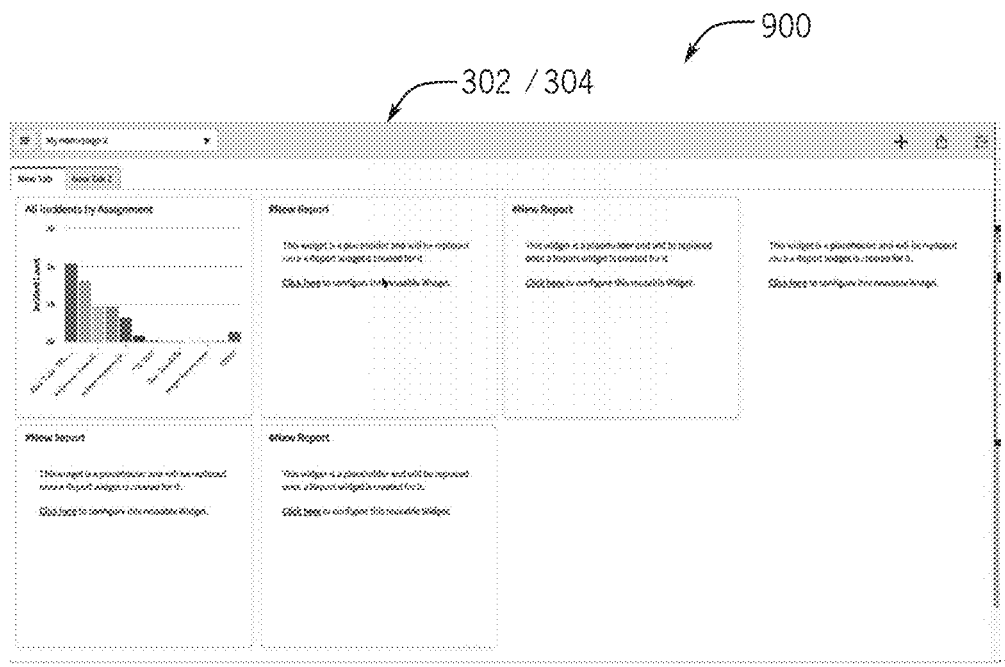
FIG. 9 is an illustration of a GUI for facilitating a configured layout, in accordance with an embodiment.

An example of a completed homepage 302/dashboard 304 is depicted in the GUI 900 of FIG. 9.

Returning to FIG. 3, as mentioned above, there may be more flexibility in configuring a dashboard 304 over a homepage 302. For example, widgets 306 may be placed in dynamic locations (e.g., not subject to placement within pre-sized/pre-placed containers 308. However, it may be burdensome to generate dashboards 304 from scratch after time and effort has already been afforded to creating a homepage 302. Accordingly, in some embodiments, a conversion process 316 may be implemented to convert a homepage 302 to a dashboard 304.

The conversion process 316 may identify the widgets 306 found on the homepage 302 (block 318). For example, a computer-readable representation of the homepage 302 (e.g., a homepage object) may be traversed to identify each of the widgets 306 on the homepage 302.

Further, the conversion process 316 may identify the containers 308 and their associated sizes and placements for the identified widgets 306 found on the homepage 302 (block 320). For example, the computer-readable representation of the homepage 302 (e.g., a homepage object) may be traversed to identify each of containers 308 containing the widgets 306 oh the homepage 302. Position and/or size attributes of the containers 308 may be identified by accessing object attributes of the computer-readable representation of the homepage 302.

Once the widgets 306 and the containers 308 and their attributes are identified. A corresponding dashboard 304 may be generated (block 322). For example, computer instructions may generate a computer-readable representation of the homepage 302, inserting the widgets 306 at the position and/or size identified by the container 308 attributes. Once the dashboard 604 is generated, it may be accessed and the size and position of the widgets 306 may be modified dynamically.

Figure 10:
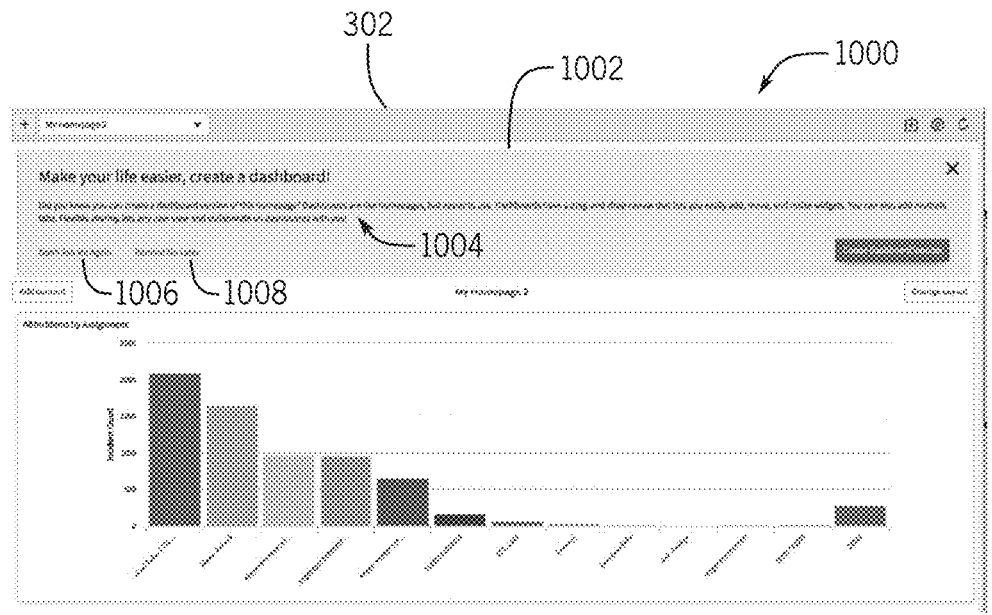
FIG. 10 is an illustration of a GUI for facilitating a conversion prompt from a homepage to a dashboard, in accordance with an embodiment.

Certain GUI prompts may facilitate homepage 302 conversion to a dashboard 304. For example, FIG. 10 is an illustration of a GUI 1000 that provides a conversion prompt 1002 for converting a homepage 302 to a dashboard 304, in accordance with an embodiment. As illustrated, the conversion prompt 1002 may provide an indication 1004 indicating the improvements of dashboards 304 over homepages 302. For example, in FIG. 10, the indication notes that "Dashboards have a drag-and-drop canvas that lets you easily add, move and resize widgets. You can also add multiple tabs." The indication 1004 also indicates that dashboards include flexible sharing, which will be discussed in more detail below. The conversion prompt 1002 may include a "Don't Ask Me Again" option 1006 that removes the conversion prompt 1002 without implementing the conversion process 316 of FIG. 3. Another option, the "Remind Me Later" option 1008 removes the conversion prompt 1002 for the current session, but re-displays the conversion prompt 1002 in subsequent sessions. A third option, the "Create Dashboard Version" option, triggers the conversion process 316 of FIG. 3.

Figure 11:
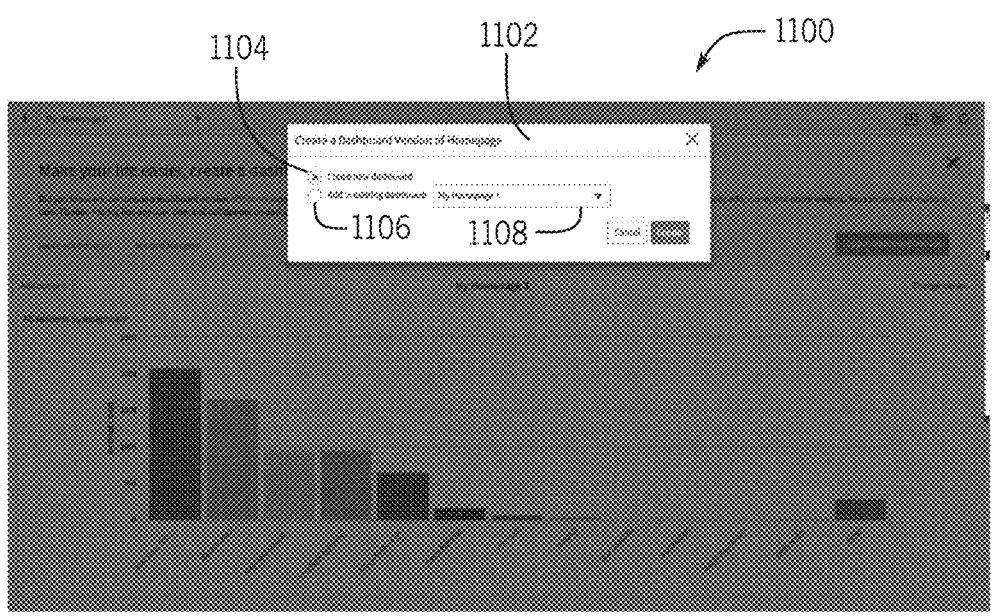
FIG. 11 is an illustration of a GUI for facilitating a dashboard destination prompt, in accordance with an embodiment.

Certain information regarding the conversion may be useful to complete the conversion process 316 of FIG. 3. FIG. 11 is an illustration of a GUI 1100 providing a dashboard destination prompt 1102, in accordance with an embodiment. The dashboard destination prompt 1102 prompts for a desired destination for the dashboard 304 conversion. Options include creating a new dashboard, by selecting option 1104 and/or adding the dashboard 304 conversion to an existing dashboard, by selecting option 1106. Option 1106 includes an associated selection list 1108, which provides a list of existing dashboards 304 accessible for editing. The selection list 1108, in some embodiments, may only provide dashboards 304 with which a currently logged in user has access to modify. Based upon a selection of one of the options 1104 or 1106, the widgets 306 of the homepage 302 will be transferred to either a new dashboard 304 or appended to an existing dashboard 304.

Figure 12:
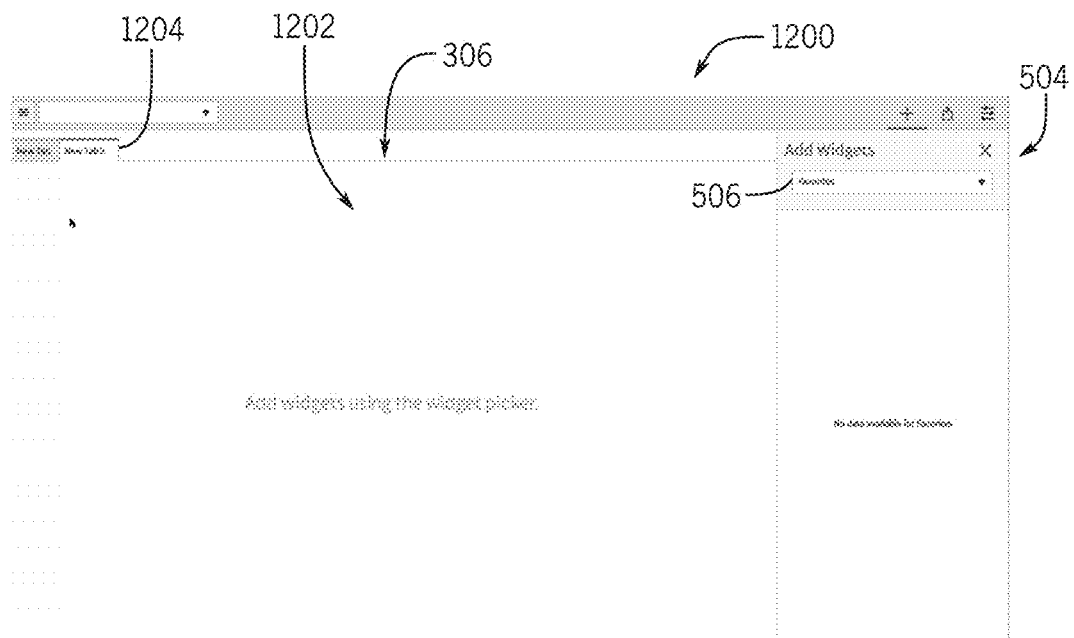
FIGS. 12 and 13 are illustrations of GUIs for facilitating addition of widgets to a homepage/dashboard, in accordance with an embodiment.
Figure 13:
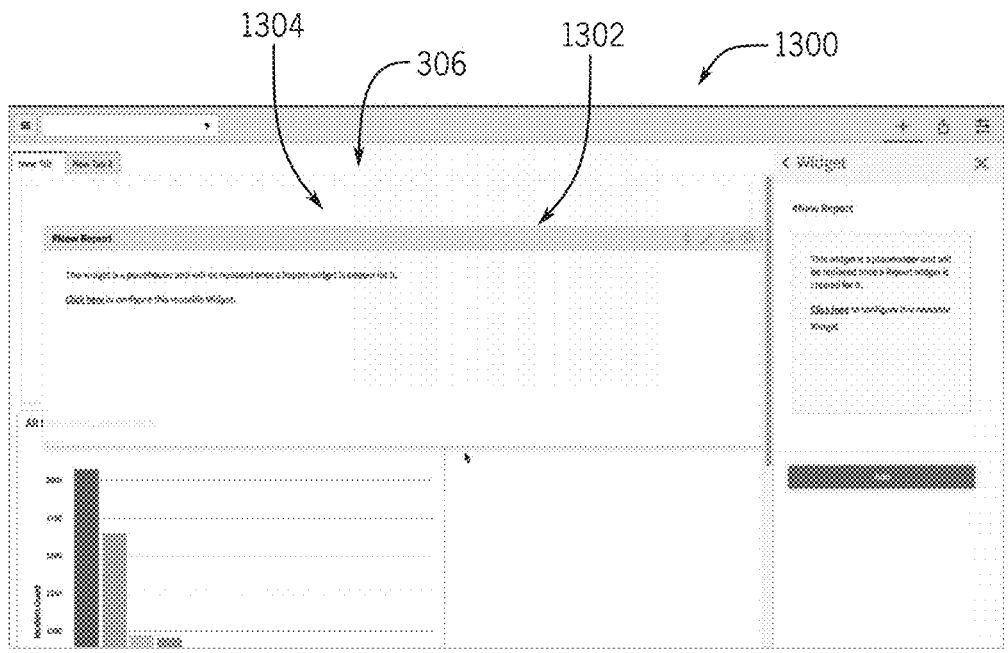
Figure 14:
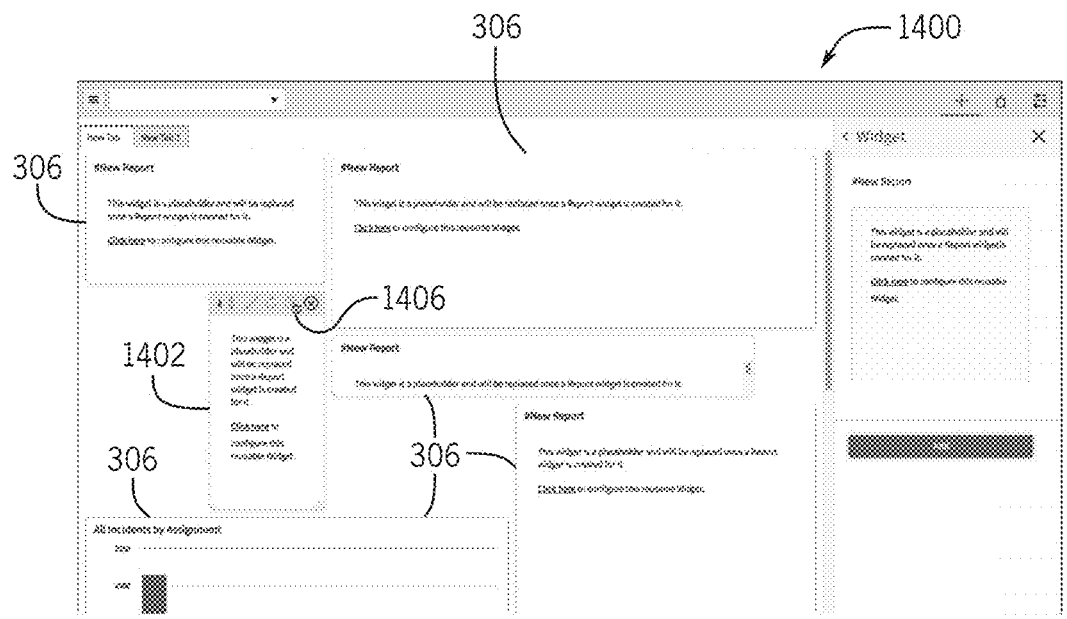
FIGS. 14 and 15 are illustrations of GUIs for facilitating widget editing on a homepage/dashboard, in accordance with an embodiment.
Figure 15:
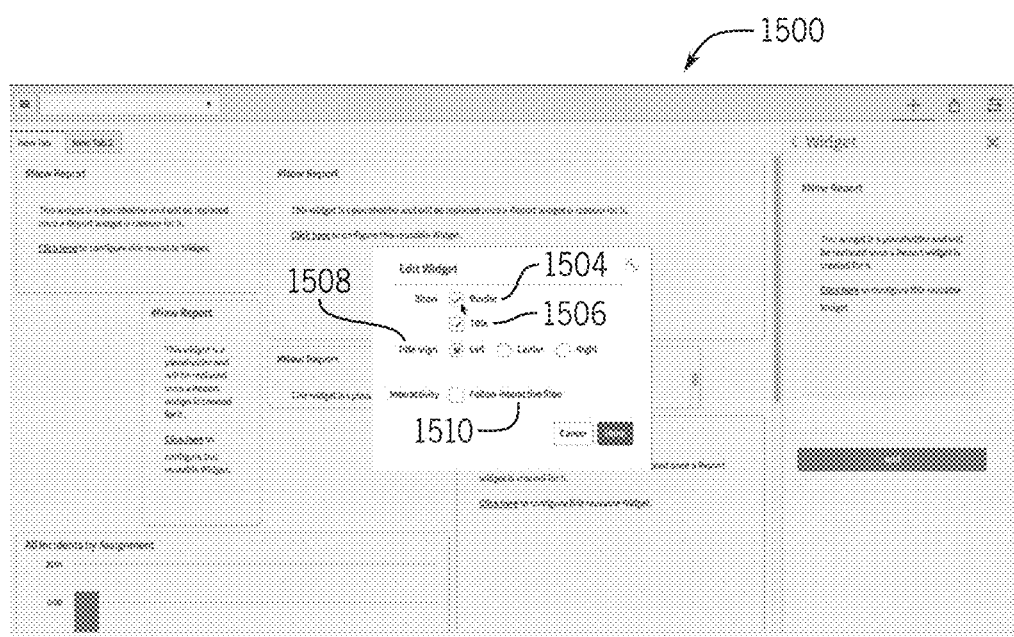

As mentioned above, dashboards 306 allow widgets 306 to be dragged and dropped into any location within a canvas of a dashboard 306. Further, the widgets 306 can be dynamically sized and re-arranged. Turning to a discussion of the dynamic widget positioning and resizing, FIG. 12 is an illustration of a GUI 1200 illustrating a blank canvas 1202 where widgets 306 may be placed. In FIG. 12, the canvas is formed on a second tab 1204 (e.g., similar to the tab created in FIG. 6). As previously discussed, a dialog box (e.g., the Add Widget sidebar 504) may be provided, such that a selection of a widget 306 may be selected from the selection list 506 and placed in the canvas 1202 (e.g., via drag and drop). For example, in FIG. 13, the GUI 1300 illustrates the "New Report" widget 1302 being dragged and dropped to the canvas 1304. FIG. 14 illustrates a GUI 1400 presenting dynamically resized and positioned widgets 306. In addition, in some embodiments, when a hover over occurs on one of the widgets 306, an edit bar 1402 may appear. The edit bar may include a configuration option 1406, which may be used to edit characteristics of the widget 306. For example, FIG. 15 illustrates a GUI 1500 where a characteristic editing dialog box 1502 is presented upon selection of the configuration option 1406. The characteristic editing dialog box 1502 may include a border option 1504 to selectively turn a border for the widget 306 on or off. Further, the title option 1506 may selectively turn a title presentation for the widget 306 on or off. The title align option 1508 may selectively determine whether the title of the widget 306 is left justified, right justified, or centered. The interactivity option 1510 selectively enables an interactive filter, which may filter some of the data from the report visualized by the widget 306, as will be discussed in more detail below.

Figure 16:
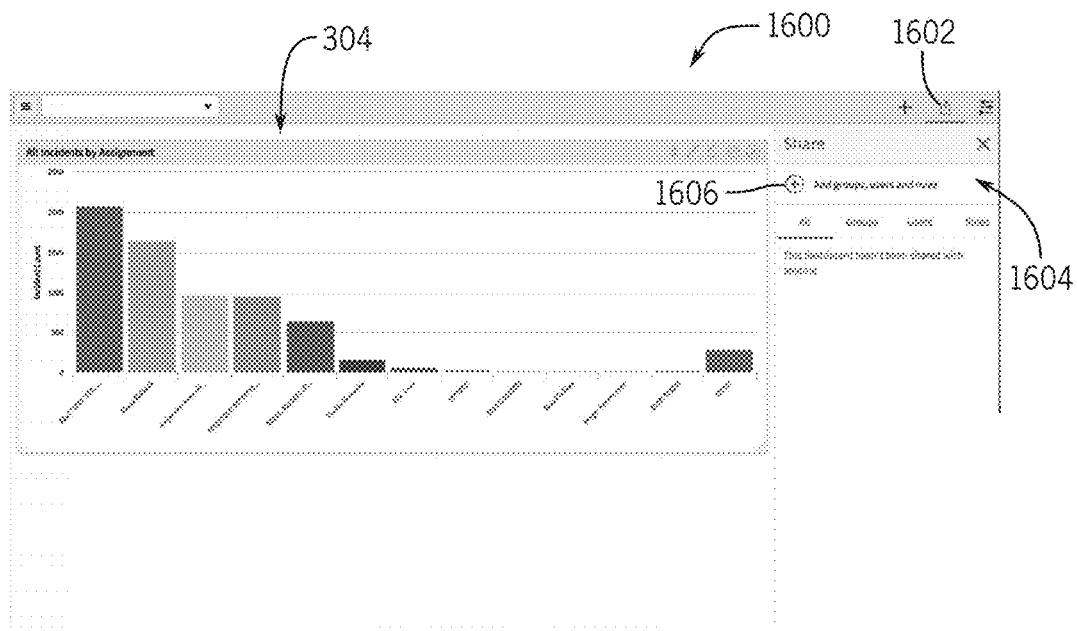
FIGS. 16-19 are illustrations of GUIs for facilitating sharing of a homepage/dashboard, in accordance with an embodiment.
Figure 17:
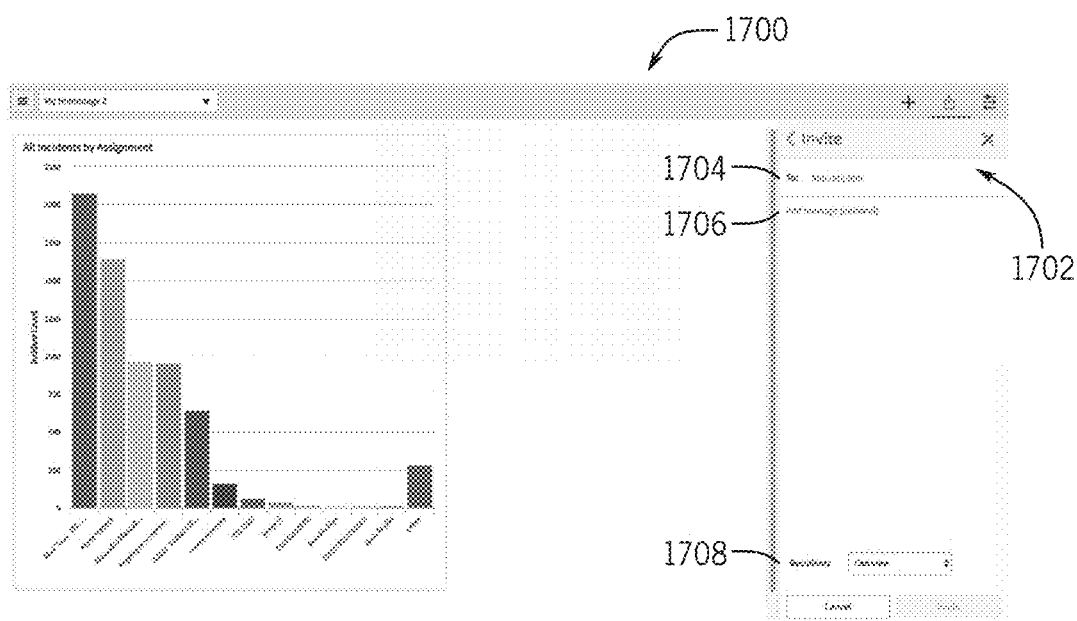
Figure 18:
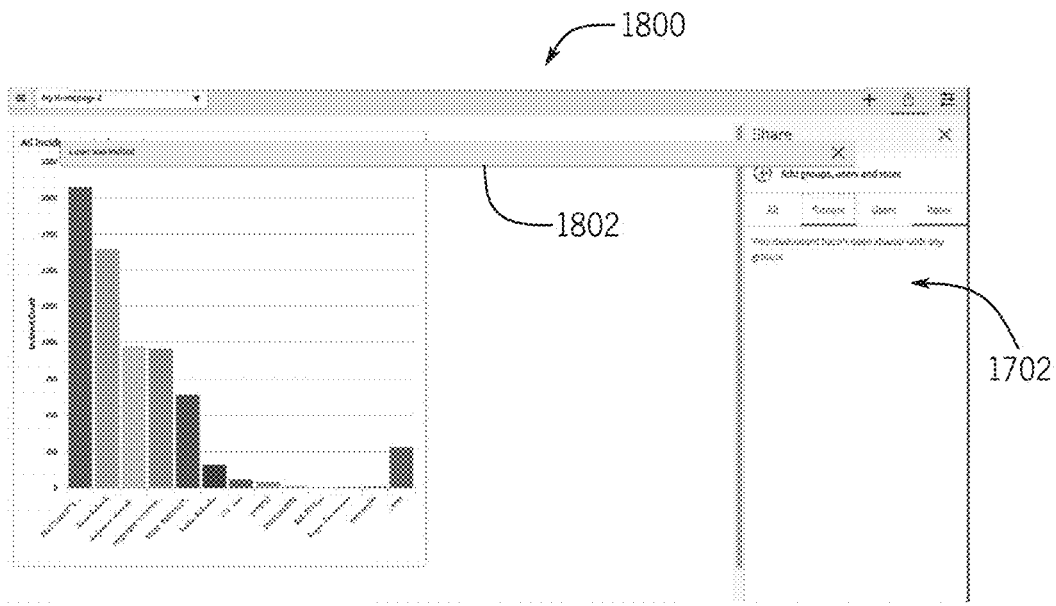
Figure 19:
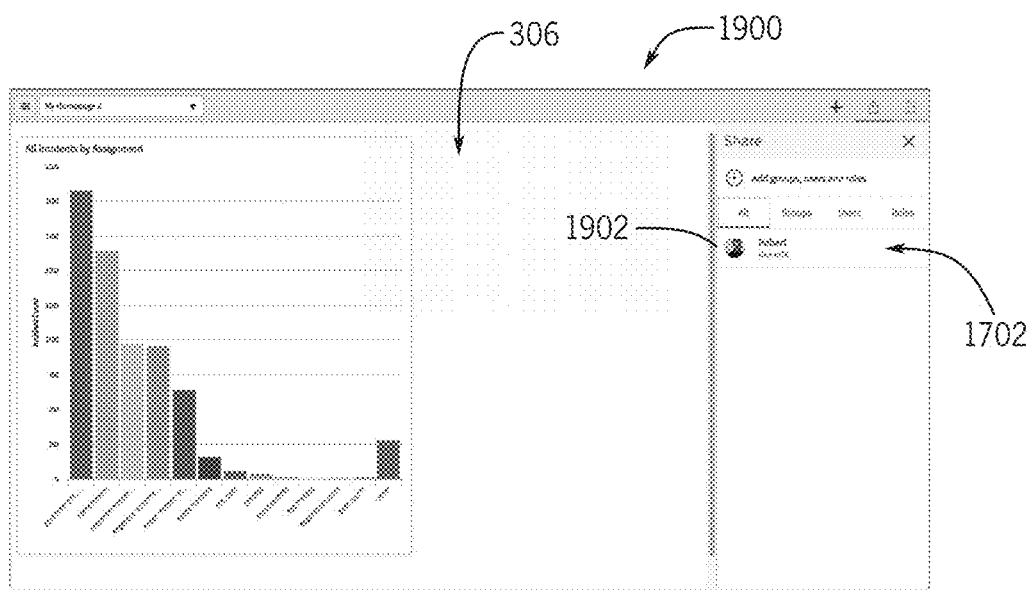

Further, as mentioned above, in some embodiments, dashboards 304 may be shareable. FIGS. 16-19 are illustrations of GUIs for facilitating sharing of a dashboard 304, in accordance with an embodiment. In FIG. 16, GUI 1600, a request for sharing is provided by selecting a sharing indicator 1602. Upon selection of the sharing indicator 1602, a sharing dialog box (e.g., sharing sidebar 1604) may be presented. In some embodiments, users, roles, and/or groups of users and/or roles may be selected as destinations for the shared dashboard 304. For example, when the add groups, users, and/or roles option 1606 is selected, the users, groups and/or roles may be selected. For example, in FIG. 17, GUI 1700 provides a new dialog box (e.g., the invite sidebar 1702). The invite sidebar 1702 includes a recipient field 1704 for the recipient (e.g., the group, user, and/or role), a message field 1706 where an option message may be provided when the sharing notification is sent, and an access rights field 1708 where access rights associated with the share may be provided. For example, the access rights may include view rights, edit rights, delete rights, etc.

Once the invitation is sent, a notification may be provided. For example, in FIG. 18, GUI 1800 displays a notification 1802 indicating that one user was invited. Upon acceptance of the invitation, a notification may be provided in the share sidebar 1702. For example, in FIG. 19, the GUI 1900 provides a shared indicator 1902 in the share sidebar 1702. For example, in FIG. 19, the shared indicator 1902 indicates that the dashboard 306 is being shared with the user "Robert".

Performance Analytics

Figure 20:
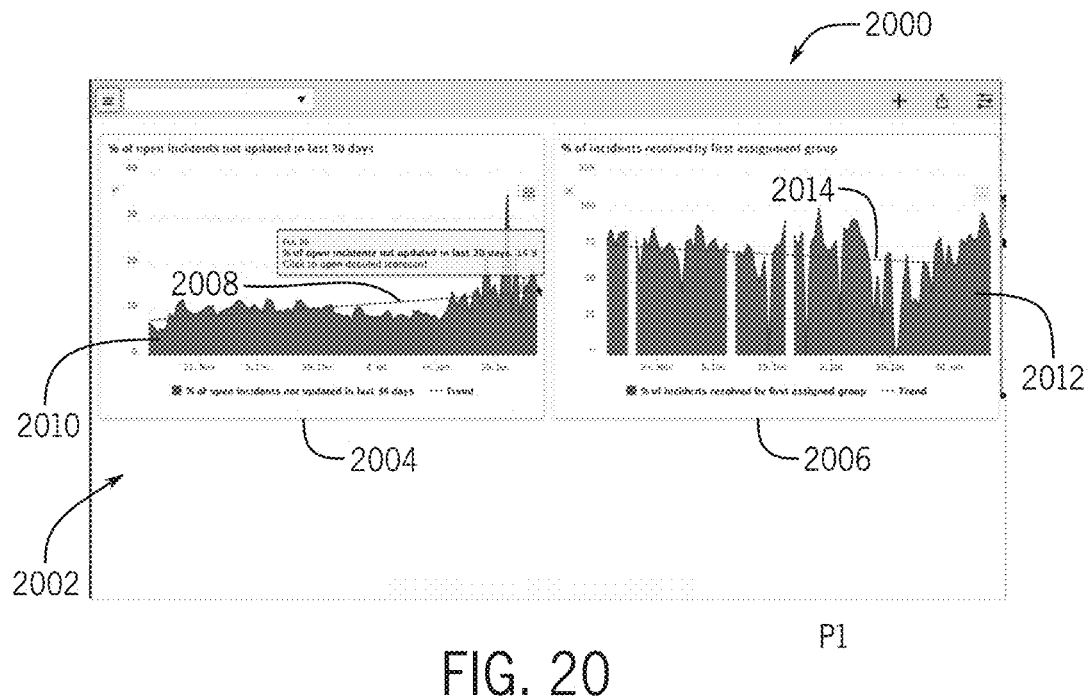
FIG. 20 is an illustration of a GUI of a performance analytics widget dispose on the homepage/dashboard, in accordance with an embodiment.

Turning now to a discussion of a particular widget 306, called the performance analytics widget, FIG. 20 is an illustration of a GUI 2000 of a performance analytics widget 2002 positioned on the homepage 302 and/or dashboard 304, in accordance with an embodiment. The performance analytics widget 2002 provides a visualization of key performance indicators (KPIs) and metrics. In the current embodiment, two data plots 2004 and 2006 are provided. Data plot 2004 provides an indication of a percentage of open incidents (X-axis) over a period of time ranging from the last 30 days (Y-axis). Additionally a trend 2008 is defined and presented based upon the data 2010 in the data plot 2004. The data plot 2006 includes data 2012 indicating a percentage of incidents resolved by a first assignment group (X-axis) over a period of time (Y-axis). Further, a trend 2014 is defined and presented based upon the data 2012.

Figure 21:
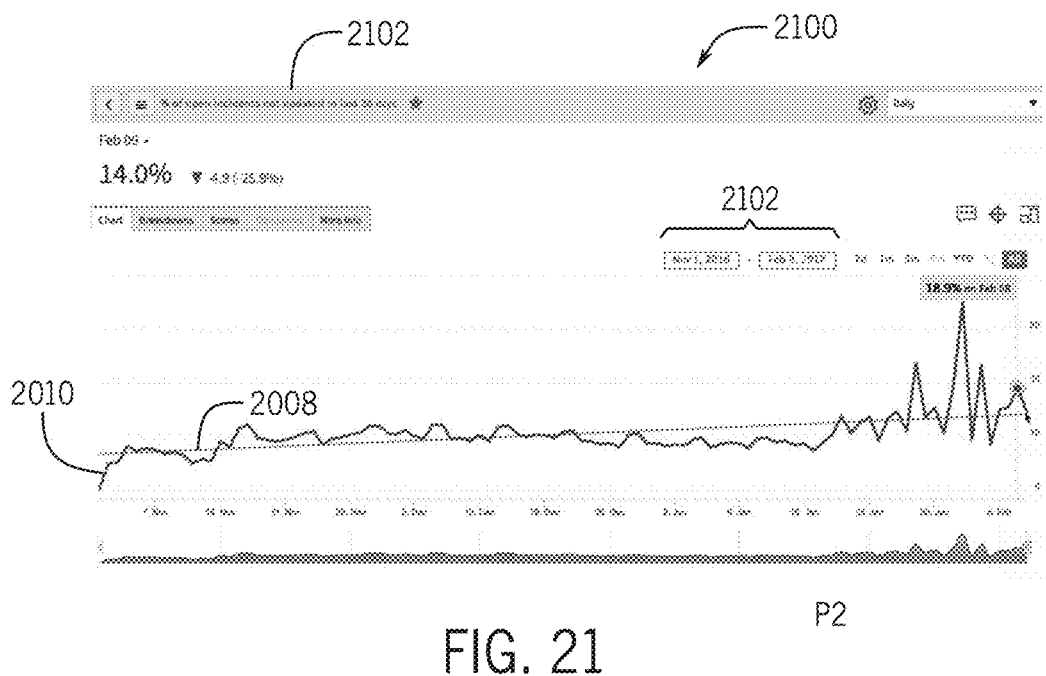
FIG. 21 is an illustration of a GUI that provides a deep-dive into the performance analytics widget of FIG. 20, in accordance with an embodiment.

When one of the plots 2004 and/or 2006 is selected, the GUI 2000 may transition to a larger view of the data with additional options. FIG. 21 is an illustration of a GUI 2100 that provides a deep-dive into the performance analytics widget 2002 of FIG. 20, based upon the selection of the data plot 2004, in accordance with an embodiment. The title 2102 illustrates the title of the data plot 2004 of FIG. 20. Further, a range selector 2102 enables selection of a new range for the data 2010.

Figure 22:
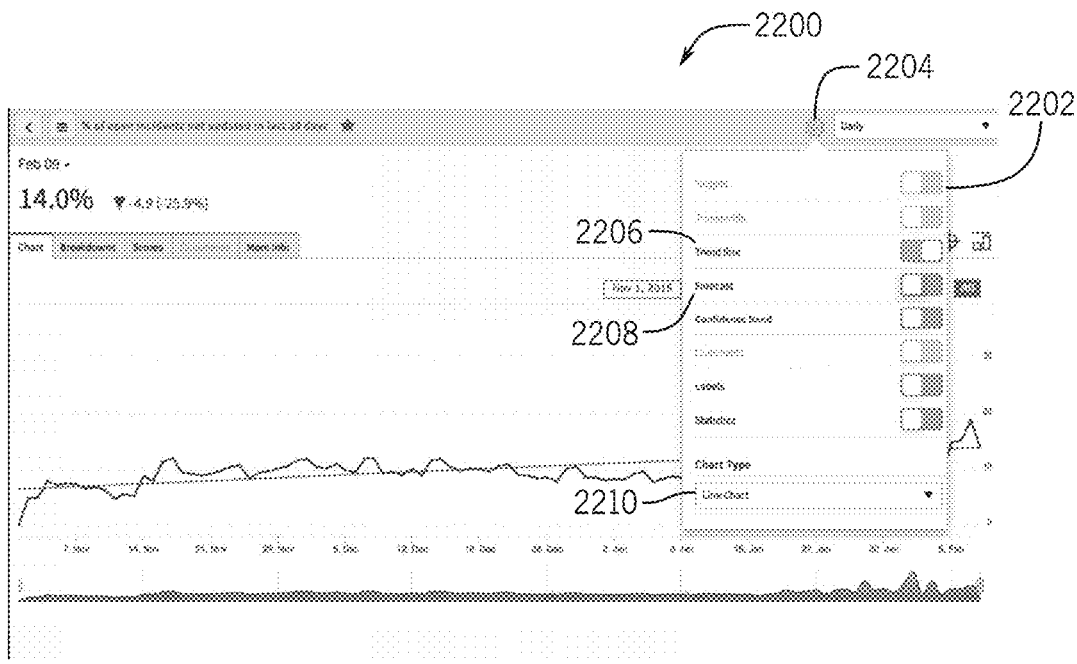
FIG. 22 is an illustration of a GUI for facilitating a variety of performance analytics tasks, in accordance with an embodiment.
Figure 23:
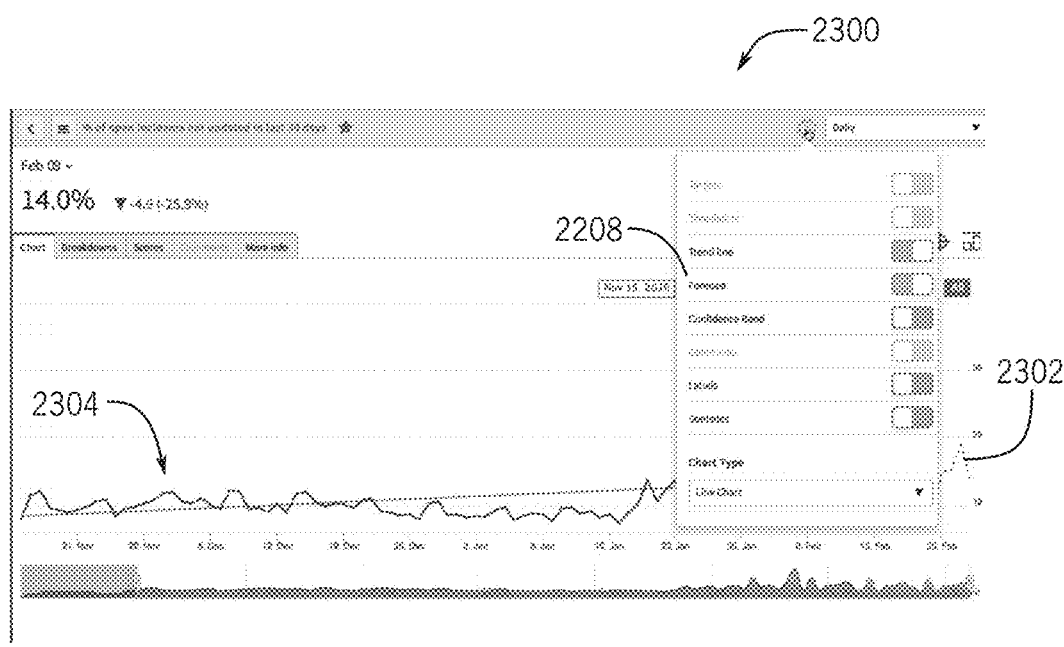
FIG. 23 is an illustration of a GUI where forecast analytics are triggered, in accordance with an embodiment.

Additional options may be selectable. For example, in FIG. 22, the GUI 2200 provides a configuration menu 2202, triggered by a configuration icon 2204. As illustrated, the trend visualization may be selectively turned on or off using the trend option 2206. Forecasting (e.g., predicting future data) may be selectively turned on or off using the forecast option 2208. Other options, such as visualization of a confidence band, labels, and/or statistics may also be selectively turned on or off. Further, the chart type may be changed from a line chart to other forms of charts (e.g., bar chart) using the chart type option 2210. In GUI 2300 of FIG. 23, the forecast analytics are triggered by selecting the forecast option 2208. The forecast analytics run and forecasting data 2302 is presented in the line chart 2304.

Figures 24, 25:
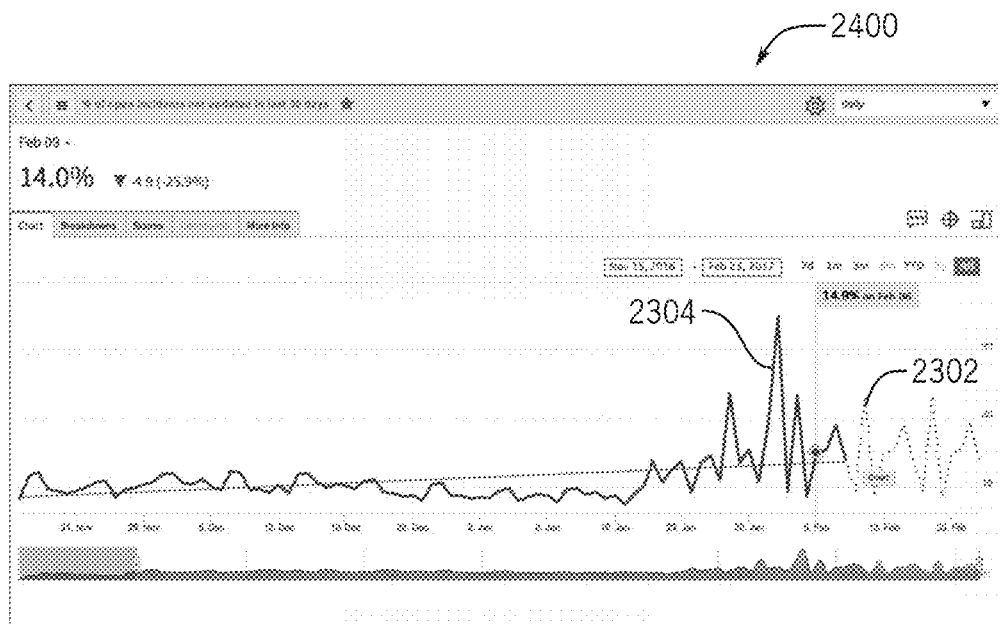
FIG. 24 is an illustration of a GUI where forecast analytics are provided, in accordance with an embodiment.
FIG. 25 is an illustration of an email notification of a prediction, in accordance with an embodiment.

FIG. 24 is an illustration of a GUI 2400 where the configuration menu 2202 is removed, showing the forecasting data 2302 results from the triggered forecast analytics. As illustrated, the forecasting data 2302 may be differentiated from observed data 2304. For example, the forecasting data 2302 may be represented in a different color, as a dashed line, etc.

The forecasting data 2302 may be used to predict when certain targets and/or thresholds may be met. FIG. 25 is an illustration of an email notification 2500 of a prediction, in accordance with an embodiment. The email notification 2500 presents a notification that a specified target (e.g., 350) for a particular indicator (e.g., Number of open incidents) will occur at a predicted time (e.g., in 5 days) based upon the forecasting data 2302 of FIG. 24.

Figure 26:
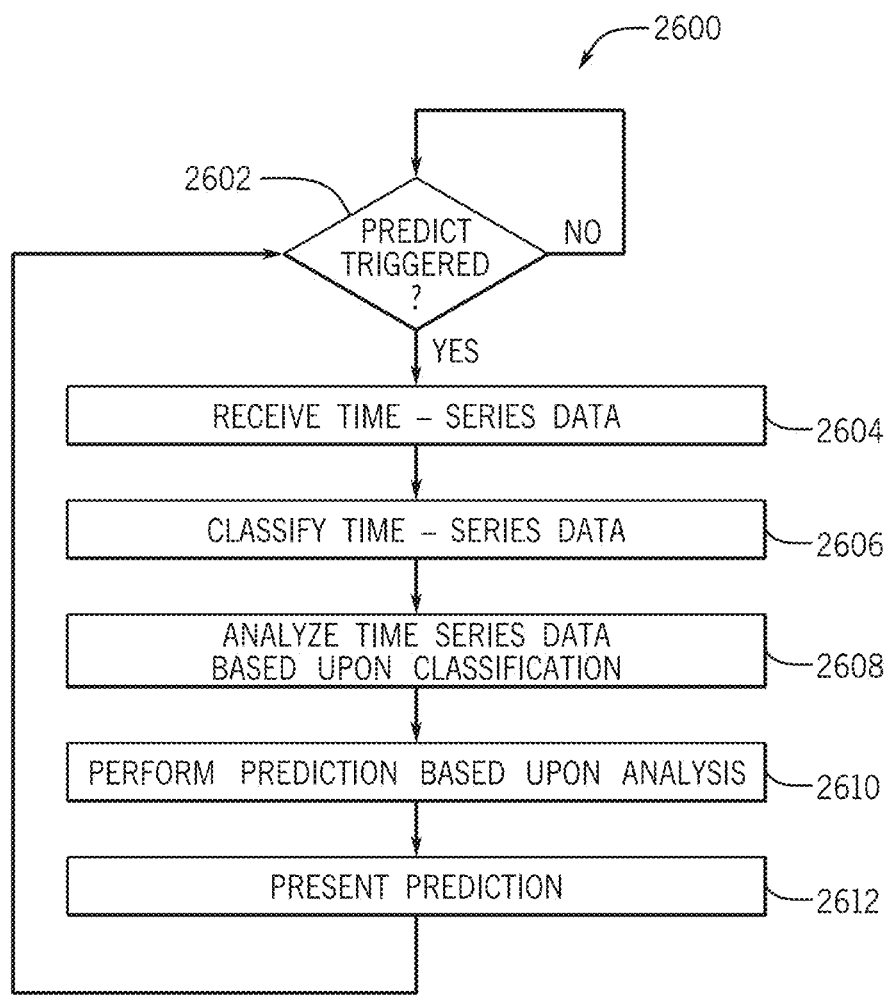
FIG. 26 is a flowchart, illustrating a process for prediction analysis, in accordance with an embodiment.

FIG. 26 is a flowchart, illustrating a process 2600 for prediction analysis, in accordance with an embodiment. The system determines whether a prediction is triggered (decision block 2602). For example, as mentioned above, the prediction may be triggered by selecting the forecast option 2208 of FIG. 23. The system continues to determine if predictions are triggered.

When predictions are triggered, time-series data is received (block 2604) and is classified (block 2606). For example, the time-series data may be mined for data patterns of the time-series data. Based upon observed patterns, the time-series data may be classified into one of a particular classification types. For example, the time-series data may be classified as having seasonal components (certain commonalities at certain times), near constant (e.g., retaining nearly the same values over a period of time), trending data, data that switches between two or more states, and/or categorical data (data that includes a set of discrete values).

Once classified, the time-series data may be analyzed based upon the classification (block 2608). For example, any trends of trending data may be used to predict future values Estimations of the future time-series data may be inferred based upon the analysis. For example, the patterns from observed time-series data may be likely to occur in future time periods. Accordingly, patterns for the observed time-series data, along with any trends present in the observed time-series data may be used to generated forecasting data 2302. For example, a trend slope for a linear trend may be used to extrapolate future predictions.

Predictions of subsequent data may be determined based upon the time-series data. For example, as mentioned above, the forecasting data 2302 may be used to predict when certain targets and/or thresholds may be met. The predictions may be presented in the homepage 302, dashboard 304, or via other mechanisms, such as email, as depicted in FIG. 25.

Figure 27:
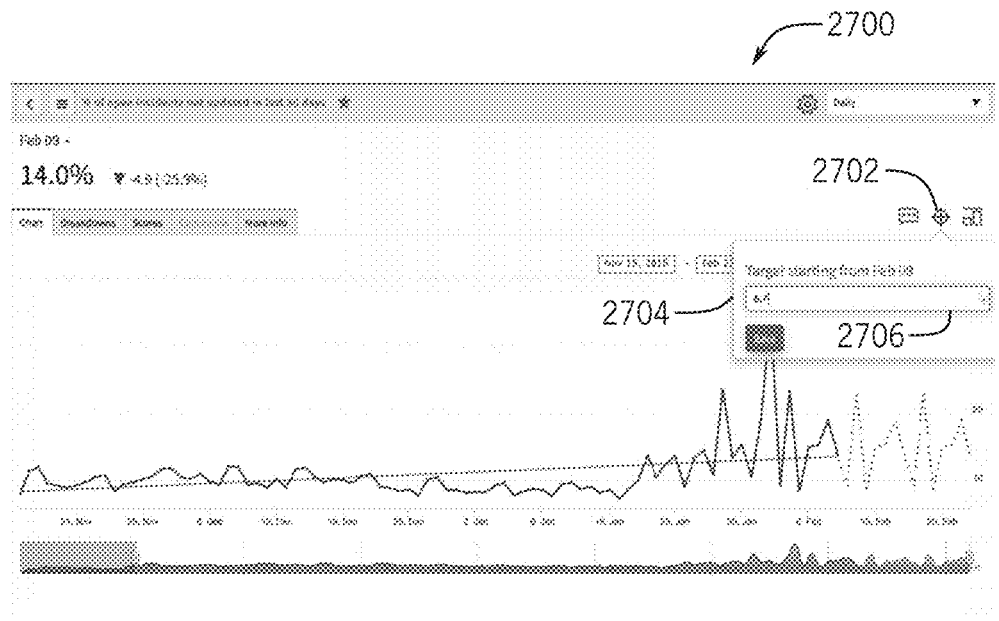
FIGS. 27 and 28 are illustrations of GUIs for facilitating targeting analytics, in accordance with an embodiment.

FIG. 27 illustrates a GUI 2700 where target prediction is triggered. Target prediction may be triggered by selecting a targeting icon 2702. Upon selection of the targeting icon 2702, a target dialog box 2704 is presented. The target dialog box 2704 may include a prompt 2706 for input of a target value. Once the target value (e.g., 8.7) is entered and saved, the GUI may provide an indication of when the target will be met.

Figure 28:
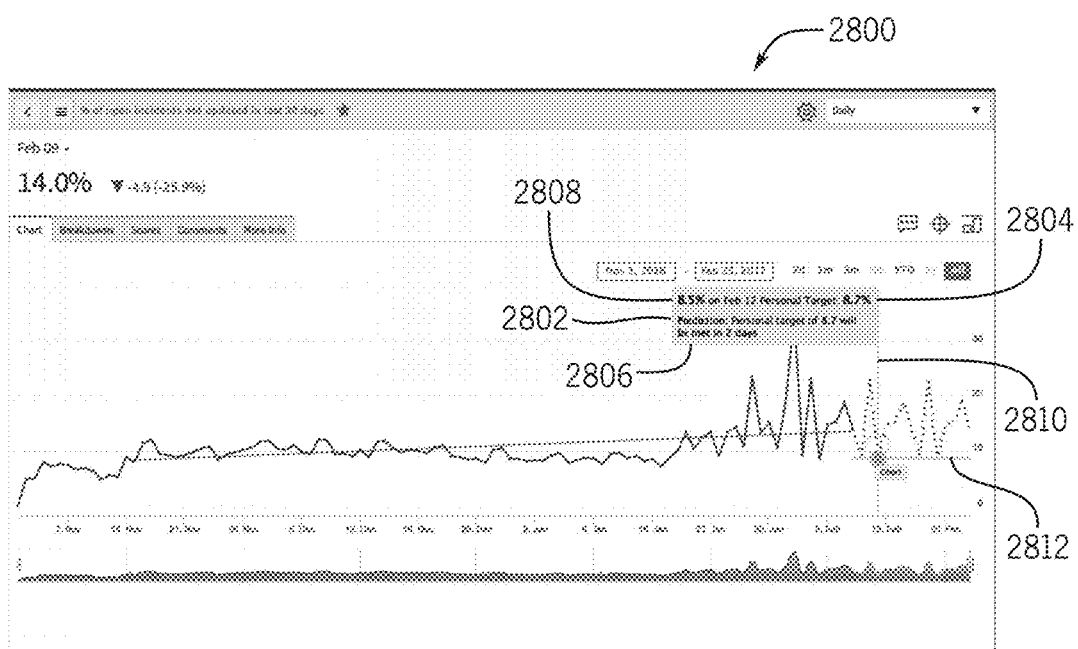

FIG. 28 illustrates a GUI 2800 where a target prediction 2802 is presented based upon the target value input in the target dialog box 2704 of FIG. 27. In certain embodiments, the target dialog box 2802 may include an indication 2804 of the target value input, an indication 2806 of a date and/or time when the target value will be met, and an indication 2808 of an actual forecasted value for the date and/or time. The target prediction 2802 may include a pointer 2810 and point 2811 that indicates the time and/or point on the chart where the target is met. Further, in some embodiments, target visualization 2812 may provide an indication of the previously submitted target value input.

Figure 29:
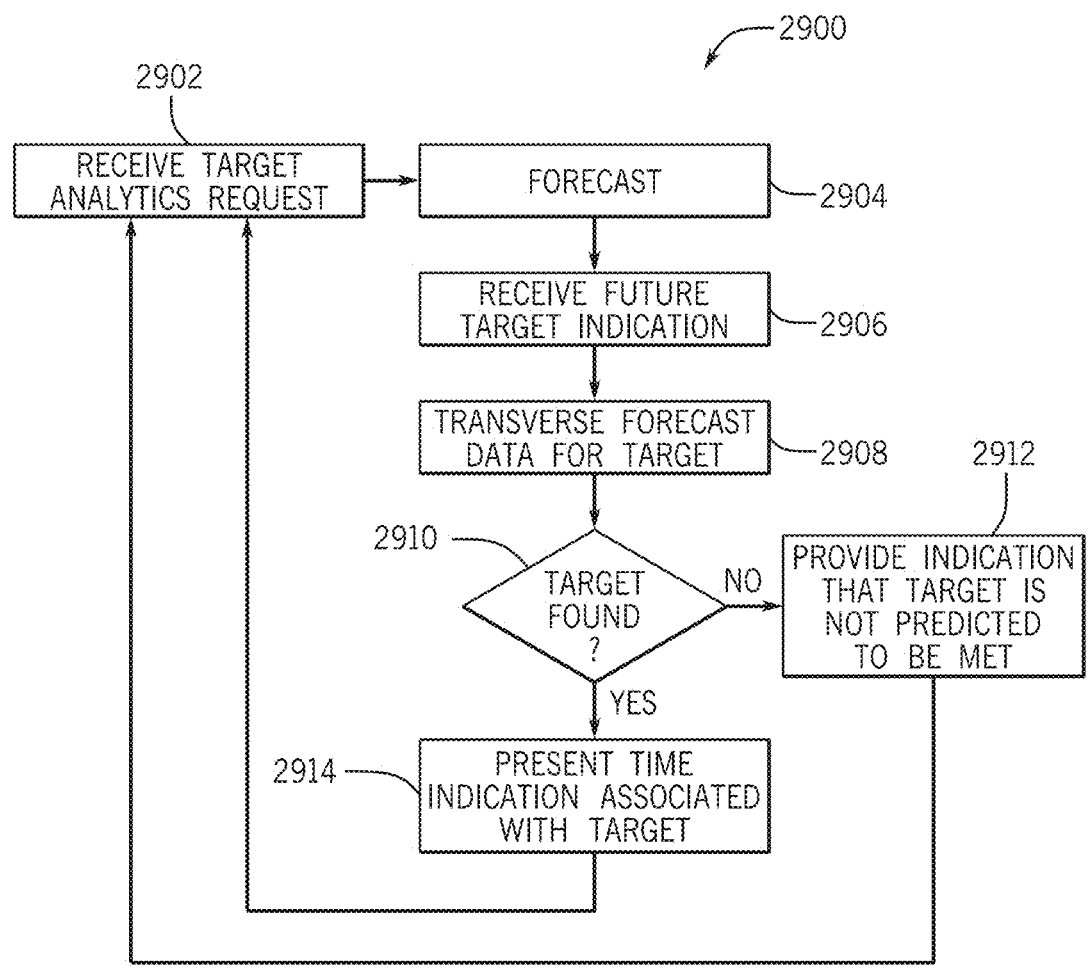
FIG. 29 is a flowchart, illustrating a process for target analysis, in accordance with an embodiment.

FIG. 29 is a flowchart, illustrating a process 2900 for target analysis, in accordance with an embodiment. The process 2900 may begin by receiving a target analytics request (block 2902). For example, as mentioned above, the request may be triggered by selecting the icon 2702 of FIG. 27.

The process 2900 continues by performing forecasting on observed time-series data (block 2904) and receiving a future target indication (block 2906). The forecasting data provides predicted future data, enabling the system find future periods where the future target indication may be satisfied. The forecast data is traversed to find periods whether the target may be satisfied (block 2908). If the target indication is not found in the forecast data (decision block 2910), an indication that the future target is not predicted to be met within the forecasting period. However, when the target indication is found, an indication associated with the target is presented (block 2914). For example, as mentioned above, the target indication 2802 of FIG. 28 may be provided.

Figure 30:
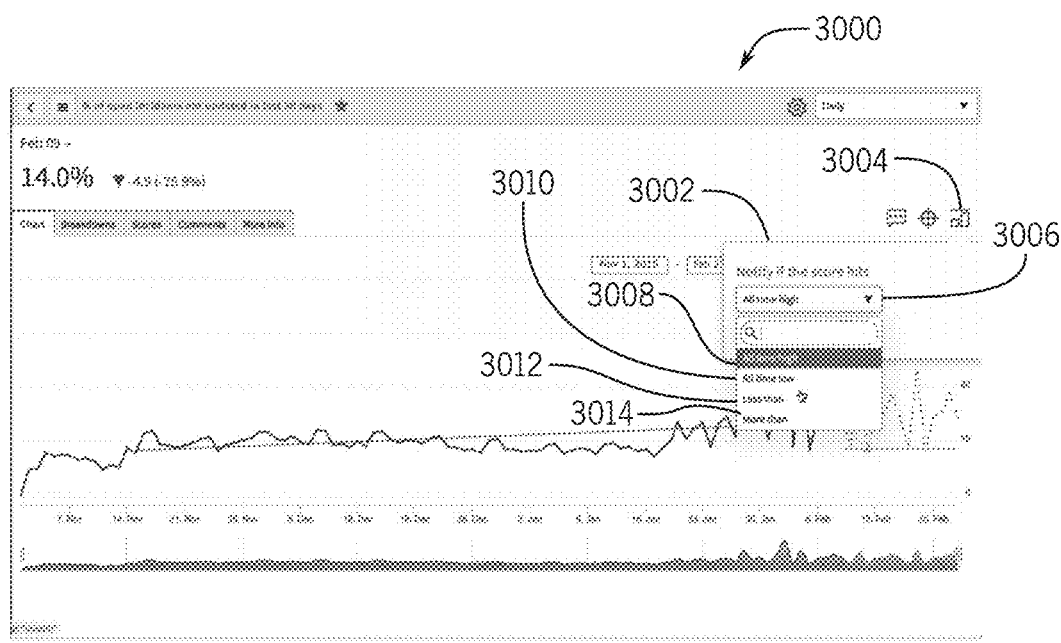
FIGS. 30-32 are an illustration of GUIs for providing notification functionality, in accordance with an embodiment.
Figure 31:
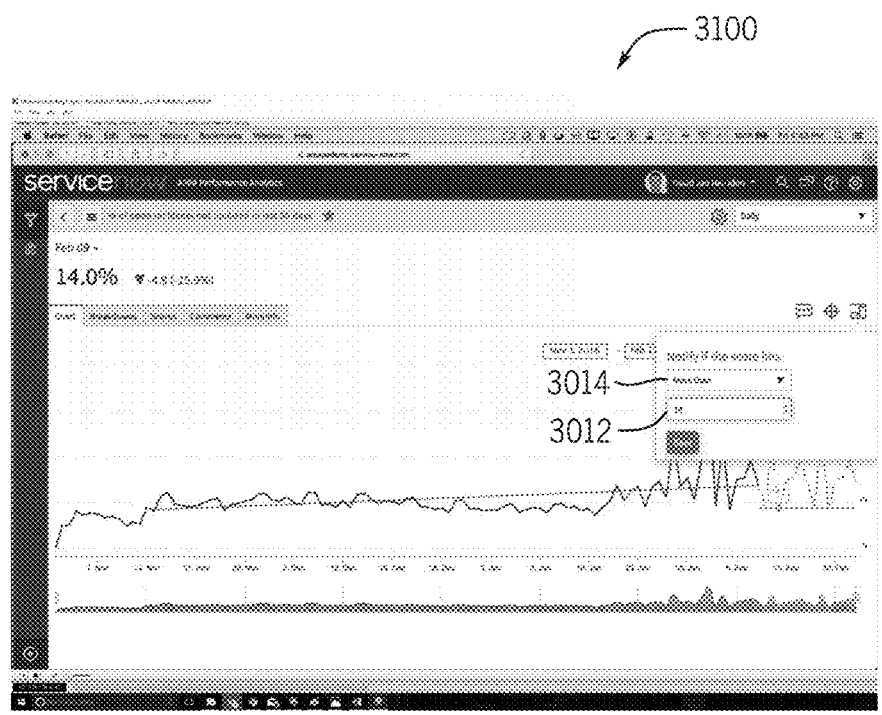

In some embodiments, notifications may be triggered based upon certain criteria. For example, GUI 3000 of FIG. 30 presents a notification dialog box 3002 when triggered by selecting a notification icon 3004. In some embodiments, the notification criteria may be selected from selection list 3006. The selection list 3006 may include an all time high option 3008, an all time low option 3010, a less than option 3012, and a more than option 3104. The all time high option 3008 triggers a notification if the time-series data breaches an all time high value for the time-series data. The all time low option 3010 triggers a notification if the time-series data breaches an all time low value for the time-series data. The less than option 3012 triggers a notification when the time-series data falls below a specified lower threshold. The more than option 3014 triggers a notification when the time-series data breaches a specified upper threshold. For example, in the GUI 3100 of FIG. 31, when the more than option 3014 is selected, an additional prompt 3102 is provided, enabling input of the threshold value (e.g., 14).

Figure 32:
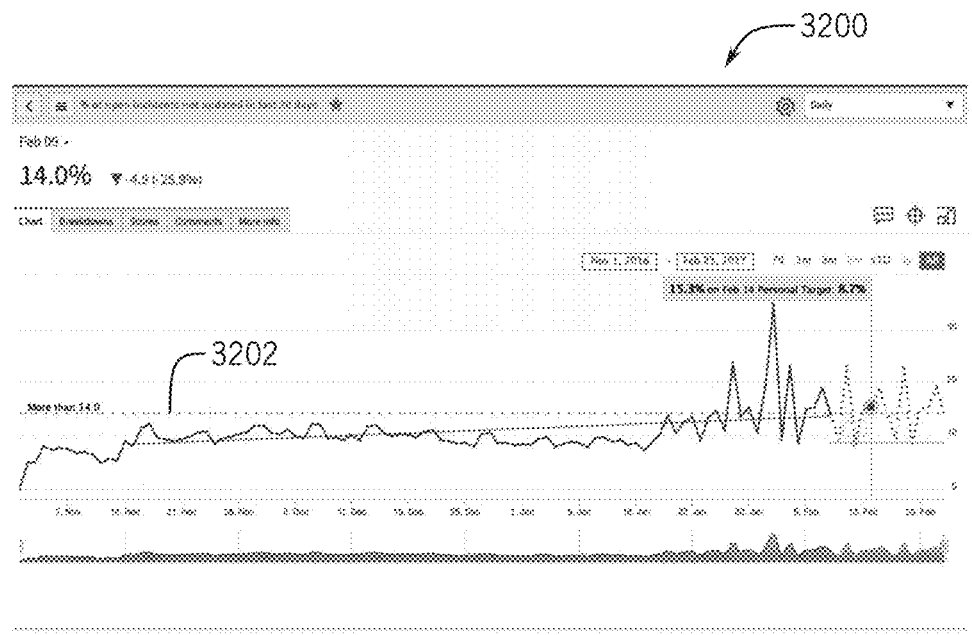

In some embodiments, once the notification criteria are set, a visualization of the threshold may be provided. For example, in FIG. 32, the GUI 3200 provides a more than threshold indicator 3202.

Figure 33:
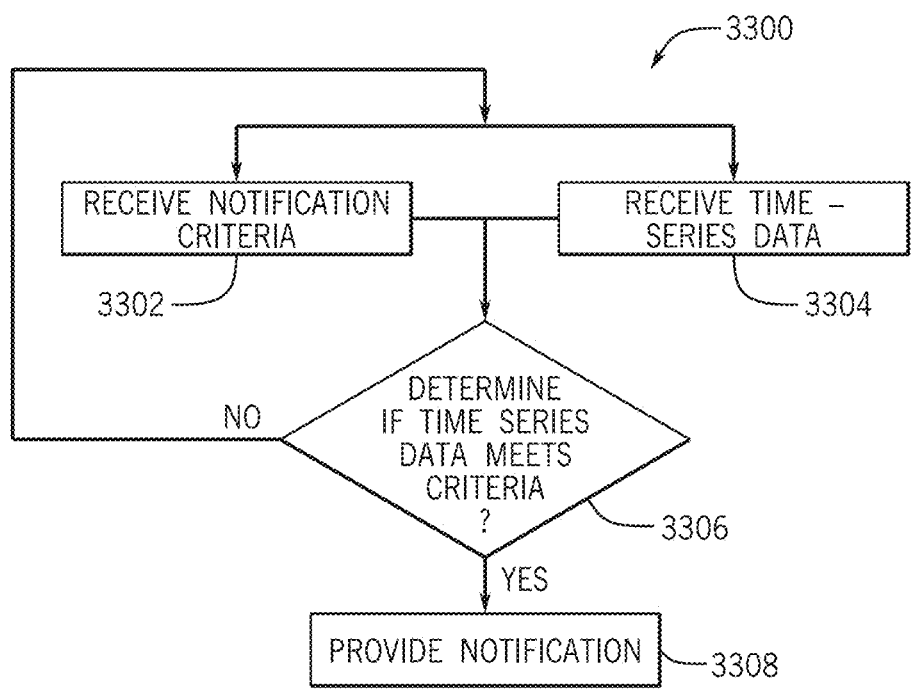
FIG. 33 is a flowchart, illustrating a process for data notification, in accordance with an embodiment.

Turning now to provision of the notifications, FIG. 33 is a flowchart, illustrating a process 3300 for data notification, in accordance with an embodiment. The process begins by receiving the notification criteria (block 3302) and the time-series data (block 3304). Next, a determination is made as to whether the time-series data meets the notification criteria (decision block 3306). If the time-series data does not meet the notification criteria, the system continues to receive new notification criteria and/or new time-series data. Otherwise, when the time-series data does meet the criteria, a notification is proved (block 3308). For example, the notification may be visually presented on the home screen 302 and/or the dashboard 304 and/or an email.

Interactive Analysis

Figure 34:
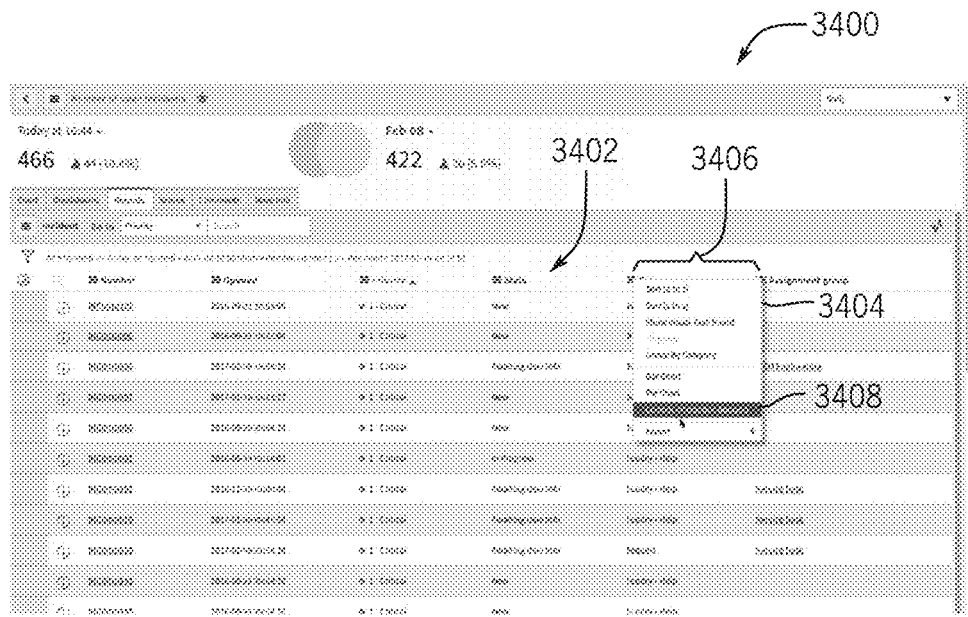
FIG. 34 is an illustration of a GUI where interactive analysis is triggered from a visualized list, in accordance with an embodiment.

As mentioned above, it may be beneficial to provide interaction with accumulated data. The following discussion relates to providing interactive analysis tools (e.g., a widget 306) that facilitates such interaction. FIG. 34 is an illustration of a GUI 3400 where interactive analysis is triggered from a visualized list 3402 of accumulated data, in accordance with an embodiment. As illustrated in FIG. 34, the GUI 3400 may provide a secondary menu 3404 related to a column of the list 3402 (e.g., category column 3406) when a secondary selection of the column (e.g., via a right-button-click) of the column. The secondary menu 3404 may include an option 3408 to initiate an Interactive Analysis function.

Figure 35:
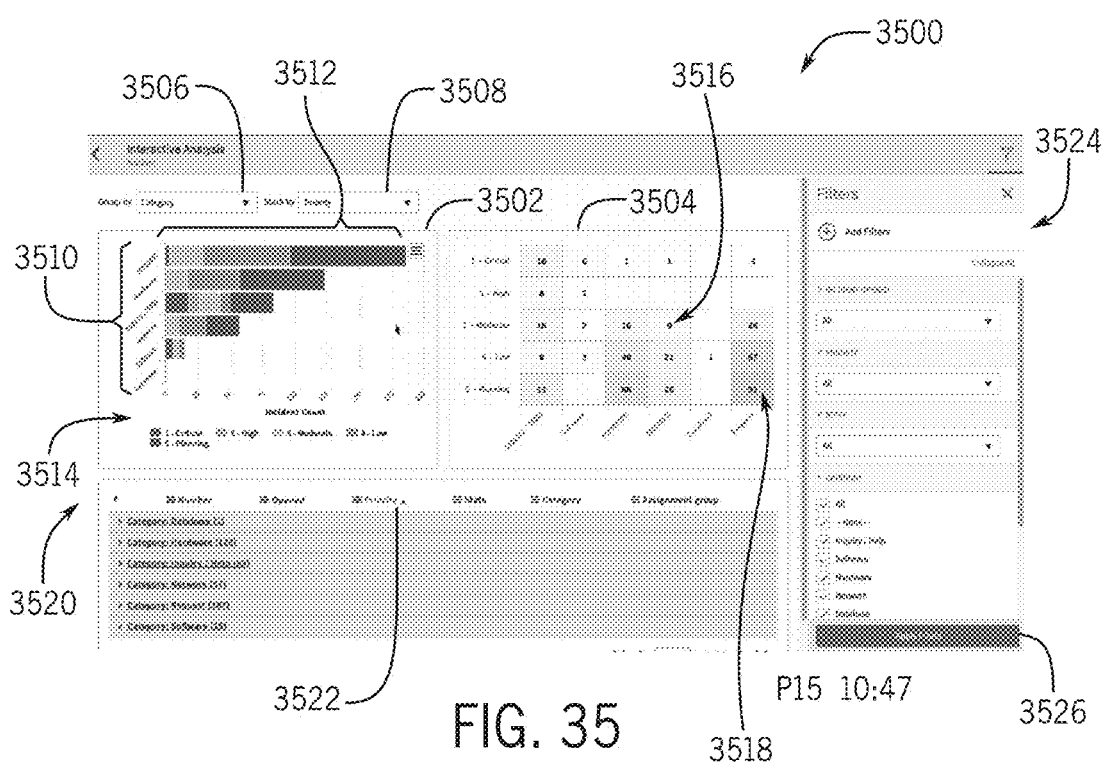
FIG. 35 is an illustration of a GUI providing an interactive analysis of the visualized list of FIG. 34, in accordance with an embodiment.

Upon receiving a request to initiate the Interactive Analysis function (e.g., via selection of the option 3408), an Interactive Analysis GUI may be displayed. For example, FIG. 35 is an illustration of a GUI 3500 that provides Interactive Analysis functionality based upon the column of the visualized list of FIG. 34 associated with the request, in accordance with an embodiment. In the current embodiment, the GUI 3500 includes a stacked bar chart widget 3502 and a heat map widget 3504 based upon the column of FIG. 34 related to the Interactive Analysis request (e.g., the category column 3406). For example, in the current embodiment, the GUI 3500 defaults to display of the data (e.g., incident data) based upon a grouping by column of FIG. 34. Further, in some embodiments, a default stacking characteristic may be selected for presentation of the chart widget 3502 and the heat map widget 3504. For example, in FIG. 34 the default stacking characteristic is set to priority. The grouping and stacking characteristics may be modified by selecting new columns of the list 3402 using the selectors 3506 and/or 3508, respectively.

As illustrated, the bars 3510 may represent the groups indicated by the indicator 3506 (e.g., the category) and the stacks 3512 within the bars may be color-coded (or otherwise differentiated) in the bar chart. The stacks 3512 represent the stacking characteristic indicated by the indicator 3508, as illustrated by the key 3514.

Further, the heat map widget 3504 may include the group by characteristic in one axis (e.g., X-axis) of the heat map widget 3504 and the stack by characteristic in another axis (e.g., the Y-axis) of the heat map widget 3504. Counts of data elements matching intersecting group by characteristics and stack by characteristics are provided in the heat map widget 3504. For example, the heat map widget 3504 identifies that nine network incidents of a moderate priority are found in the list 3402, as indicated by count 3516. In some embodiments, differing color shades may be used to indicate a relative magnitude of the counts. For example, in FIG. 35, the largest count 3518 is relatively the darkest of the counts.

In addition, the GUI 3500 may present a collapsed list 3520, grouped by the group by characteristic indicated by the indicator 3506. The collapsed list 3520 may be sorted, by default, based upon the stack by characteristic indicated by the indicator 3508. For example, in FIG. 35, the sorting default is set to priority, as depicted by the sorting indicator 3522.

The GUI 3500 may also include a filtering dialog box (e.g., sidebar) 3524, which may enable further filtering of the data presented in the GUI 3500. For example, as will be discussed in more detail below, the visualized data in the bar chart widget 3502, the heat map 3504, and the collapsed list 3520 may be filtered based upon other columns from the list 3402 of FIG. 34 or other relational data columns from related lists.

Because the GUI 3500 is provided via a cloud instance, where each update uses a data modification request and subsequent response, it may be beneficial, in certain embodiments, to refresh the visualized data only upon selecting an option 3526 to apply the filters to the GUI 3500. This may reduce a number of data requests and/or responses used in the visualization of the GUI 3500.

Figure 36:
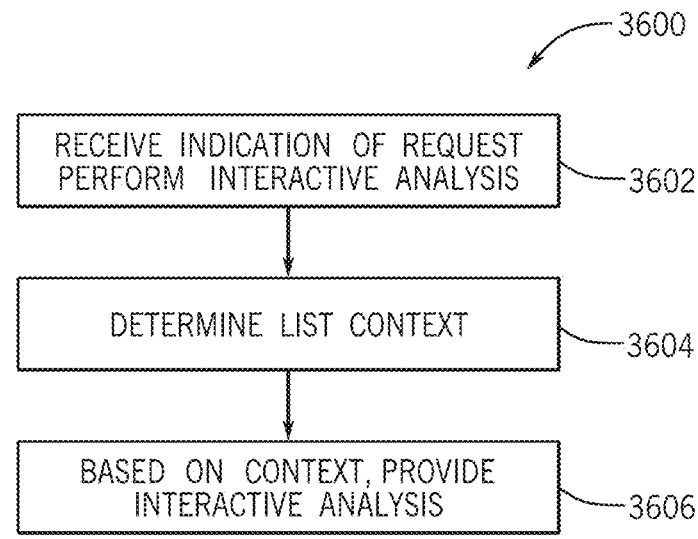
FIG. 36 is a flowchart, illustrating a process for providing interactive analysis, in accordance with an embodiment.
Figure 37:
FIGS. 37-41 are an illustration of GUIs for providing filtering, in accordance with an embodiment.
Figure 38:
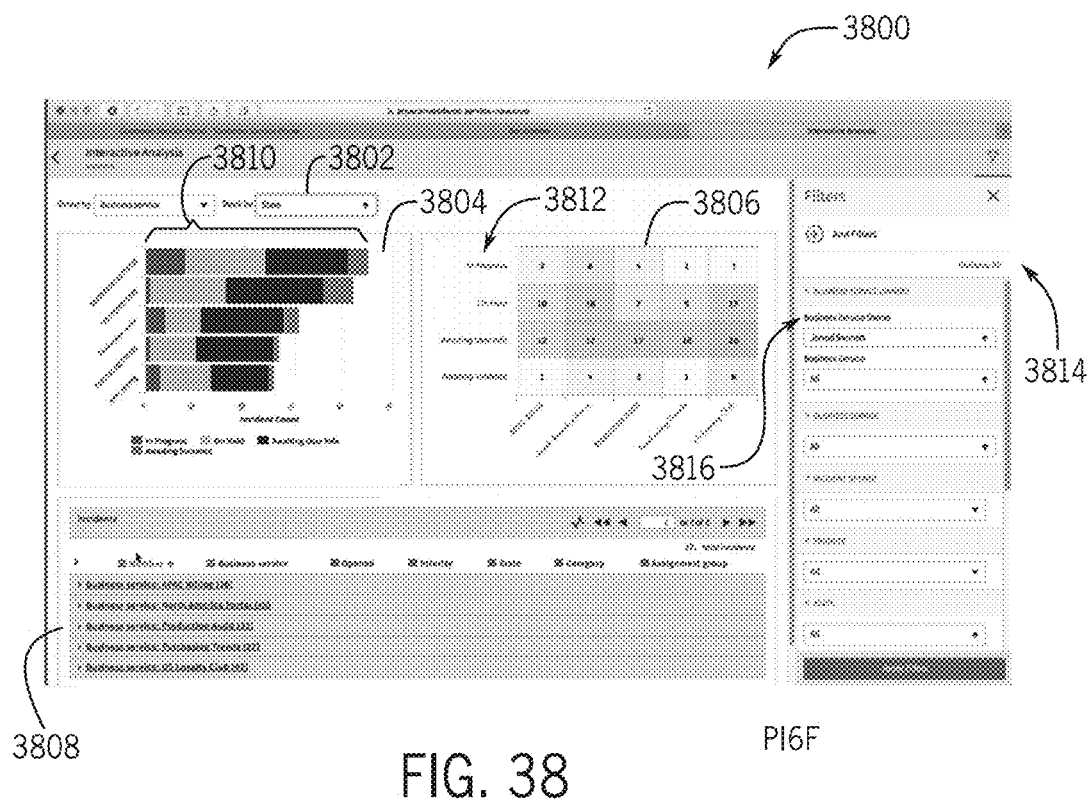

FIG. 36 is a flowchart, illustrating a process 3600 for providing the interactive analysis GUI 3500 of FIG. 35, in accordance with an embodiment. The process 3600 begins by receiving an indication of a request to perform interactive analysis (block 3602). For example, as discussed with regard to FIG. 34, the request may be received via selection of the option 3408 to launch interactive analysis.

A list context may be determined (block 3604). As mentioned above, the request may include a column indication, which may indicate a particular basis for the Interactive Analysis. For example, in FIG. 34, the option 3408 is selected from a sub-menu 3404 associated with the category column 3406. Accordingly, the primary context of the list may be defined as the category column 3408.

Based upon the primary context, the interactive analysis GUI (e.g., GUI 3500 of FIG. 35) may be presented. For example, returning to the depicted embodiment of FIG. 35, the bar chart widget 3502, the heat map 3504, and/or the collapsed list 3520 may be presented with a primary focus on the primary context (e.g., the category column 3408). Accordingly, useful information regarding the primary context may be provided very efficiently, providing easy-to-use details regarding the primary context.

Data Filtering

Turning now to a discussion of the filtering of the visualized data, FIGS. 37-41 are an illustration of GUIs for providing filtering, in accordance with certain embodiments. In the GUI 3700 of FIG. 37, the filter sidebar 3702 is presented to filter out certain data from the visualized data of the interactive analysis. Similar to the previously described embodiments, the current interactive analysis provided by GUI 3700 includes a bar chart widget 3704 and a heat map widget 3706. Additionally, a collapsible list 3708 is provided. As illustrated by the indicator 3710, the group by characteristic is "Business Service". Further, as illustrated by the indicator 3712, the stack by characteristic is "Priority".

The indicators 3710 and/or 3712 may be modified to change the presentation of the data visualized in the bar chart widget 3704, the heat map widget 3706, and/or the collapsible list 3708. For example, in GUI 3800 of FIG. 38, the indicator 3802 is changed from the previous value of priority in FIG. 37 to "State". Based upon this change, the visualization in the bar chart widget 3804, the heat map widget 3806, and/or the collapsible list 3808 changes. For example, the bar chart widget 2804 illustrates a bars with stacked states 3810, as indicated by the key 3812. Further, the heat map 3806 is modified, such that the states are presented in the Y-axis 3812. In certain embodiments, the collapsible list 3808 is not modified based upon modified stack by characteristics. However, in other embodiments, the sorting may be changed based upon this modified characteristic.

Additionally, filters may be added to the data, resulting in visualization of data that satisfies the filter criteria. For example, in the filter dialog box 3814, "Jerrod Bennet" is selected from the Business Service Owner filter selections 3816. Based upon this selection, the data visualized in the bar chart widget 3804, the heat map widget 3806, and/or the collapsible list 3808 is modified to only include data associated with "Jerrod Bennet" as the Business service owner.

Figure 39:
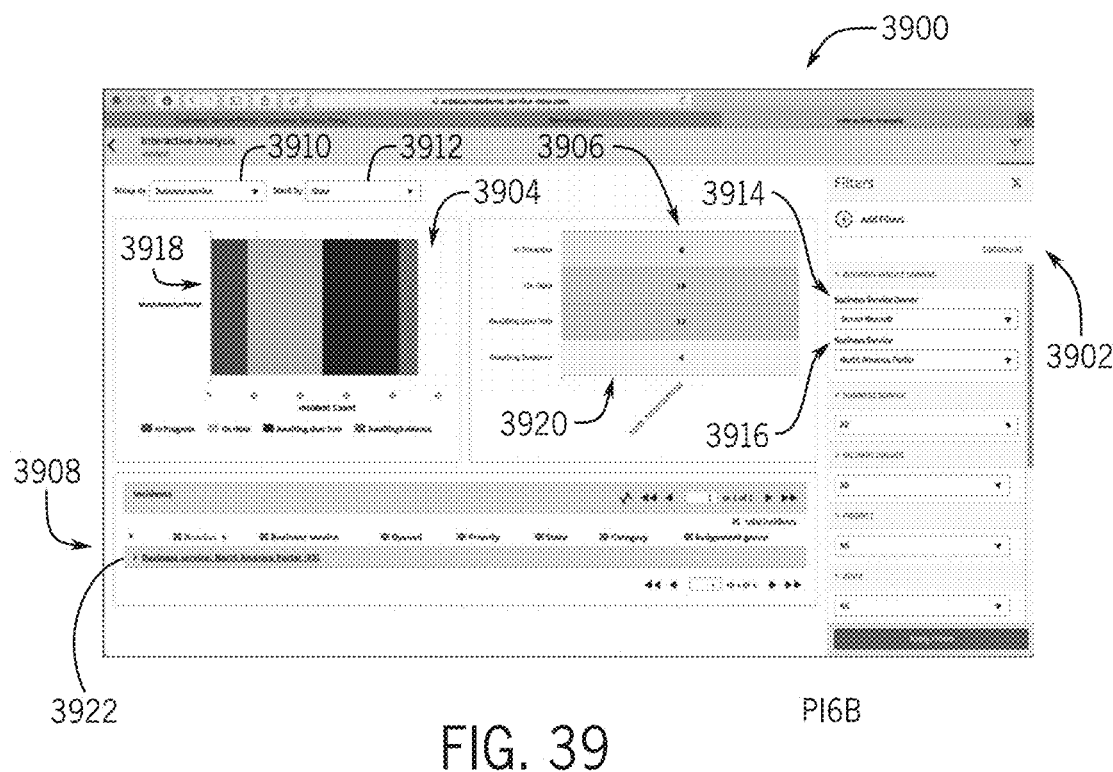

Further, cascading filters may be used to filter the data visualized in the bar chart widget 3804, the heat map widget 3806, and/or the collapsible list 3808. Cascading filters enable drilling down of filter features to filter the visualized data. For example, in FIG. 39, "Jarrod Bennet" is selected as a Business Service Owner filter 3914. Additional sub-filter selections may be provided based upon the selection of "Jarrod Bennet". For example, suppose Jarrod Bennet is associated with certain geographies (e.g., North America, Central America, etc.). A sub-filter selection may be presented upon selection of "Jarrod Bennet". In the embodiment illustrated in FIG. 39, the selection of "Jarrod Bennet" results in presentation of sub-filter options 3916 for particular business services that Jarrod Bennet is associated with. In FIG. 39, a "North America Portal" selection is selected from sub-filter options 3916, resulting in the visualized data of the bar chart widget 3904, the heat map widget 3906, and/or the collapsible list 3908 to only display data records associated with "Jarrod Bennet" and his related business service "North American Portal". Accordingly, only one bar 3918, representing business services, is provided in the bar chart widget 3904. Similarly, only one column 3920, representing the North American Portal, is provided in the heat map 3906 and only one collapsed section 3922 is provided in the collapsible list 3708.

Figure 40:
Figure 41:
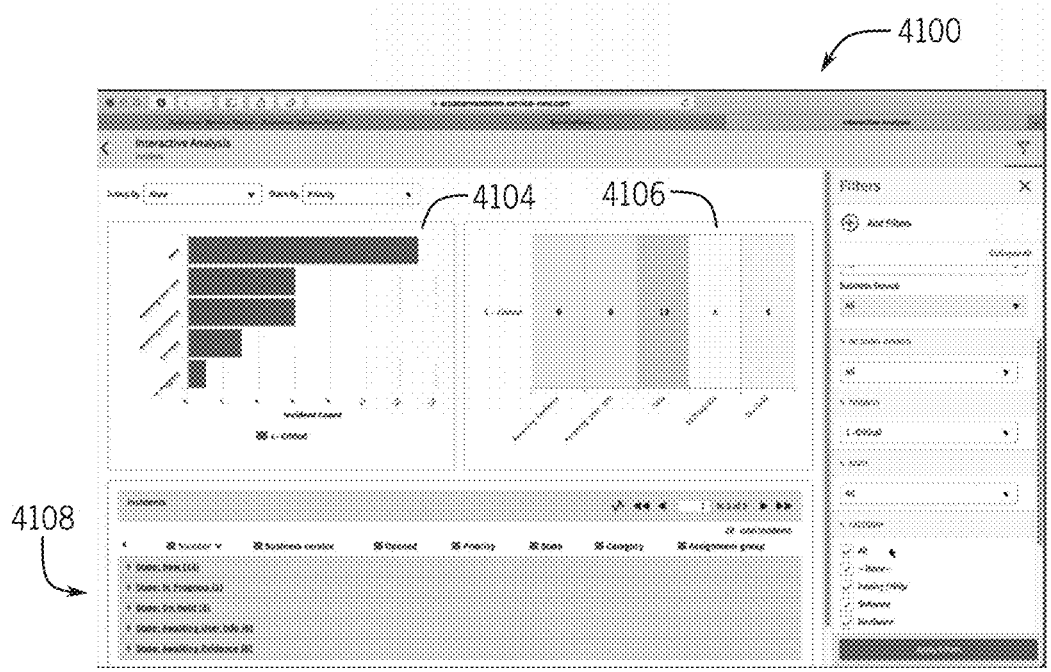

FIGS. 40 and 41 provide GUIs 4000 and 4100 illustrating application of a filter only after requesting application of the filter to the visualized interactive analysis, in accordance with an embodiment. In GUI 4000, a priority filter 4002 is set to "critical" for the bar chart widget 4004, the heat map widget 4006, and/or the collapsible list 4008. However, in the current embodiment, the filter is not applied until the "Apply Filters" option 4010 is selected from the filter sidebar 4012. Accordingly, as illustrated in FIG. 40, data records for each of the priorities is visualized in the bar chart widget 4004, the heat map widget 4006, and/or the collapsible list 4008.

As depicted in the GUI 4100 of FIG. 41, once the "Apply Filters" option 4010 is selected, the bar chart widget 4104, the heat map widget 4106, and/or the collapsible list 4108 are all updated, reflecting only the data that satisfies the filter criteria (e.g., the critical priority). For example, there is only one stack in the bar chart widget 4104 (the stack representing records with a critical priority). Further, only one row is present in the heat map 4106 (the row representing records with a critical priority). Further, the collapsible list 4108 only includes records with a critical priority.

Figure 42:
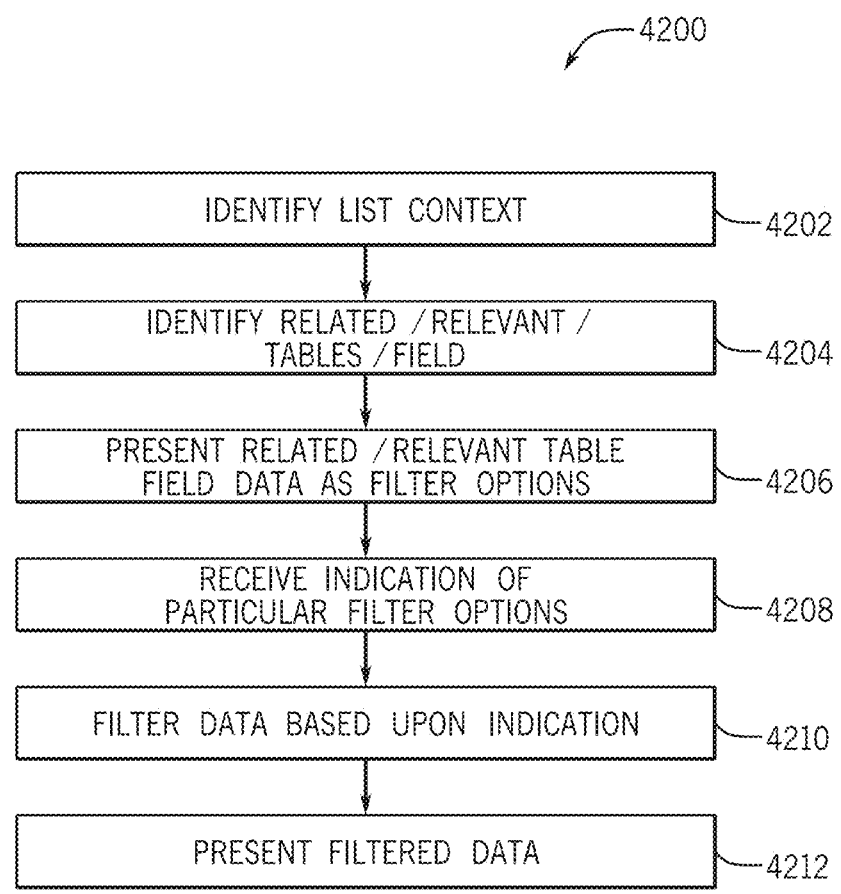
FIG. 42 is a flowchart, illustrating a process for relational filtering, in accordance with an embodiment.

FIG. 42 is a flowchart, illustrating a process 4200 for relational filtering, in accordance with an embodiment. First, a list context is identified (block 4202). For example, a relational table or tables associated with the list data is identified. For example, a list of incident records may be stored in an incident table that includes the incident number (primary key), an associated business service for the incident, an incident opening date/time, a priority, a state, a category, and an assigned group for the incident.

Related and/or relevant tables and fields may also be identified based upon the context of the list. The related and/or relevant tables and fields may be determined based upon a degree of relationship between the tables. In some embodiments, tables that are relationally connected based upon a threshold number of connections may be considered related and/or relevant tables and fields. For example, when the threshold is set to 1, a first table and/or first field that is directly related to incident table may be identified as related and/or relevant tables and fields. However, a second table and/or second field related the first table and/or first field, but not directly related to the incident table will not be identified as a related and/or relevant table and/or field, because the relationship includes 2 degrees of separation, exceeding the threshold of 1 degree of separation. To incorporate the second table and/or second field, the threshold could be increased to 2.

The related and/or relevant tables and/or fields may be presented as filter options. For example, the Business Service Owner filter options 3816 of FIG. 38 may be presented based upon these options being identified as related and/or relevant tables and/or fields.

Upon receiving an indication of a particular filter option from those presented in block 4206 (block 4208), the data may be filtered based upon the indication (block 4210) and presented (block 4212). For example, returning to FIG. 38, only records where "Jerrod Bennett" is the Business Service Owner will be presented. All other records (e.g., where "Jerrod Bennet" is not the attributed Business Service Owner are not presented. As may be appreciated, by increasing the filtering capabilities to include subsets of related tables, filtering becomes much more powerful.

Persistent Filter Settings

Figure 44:
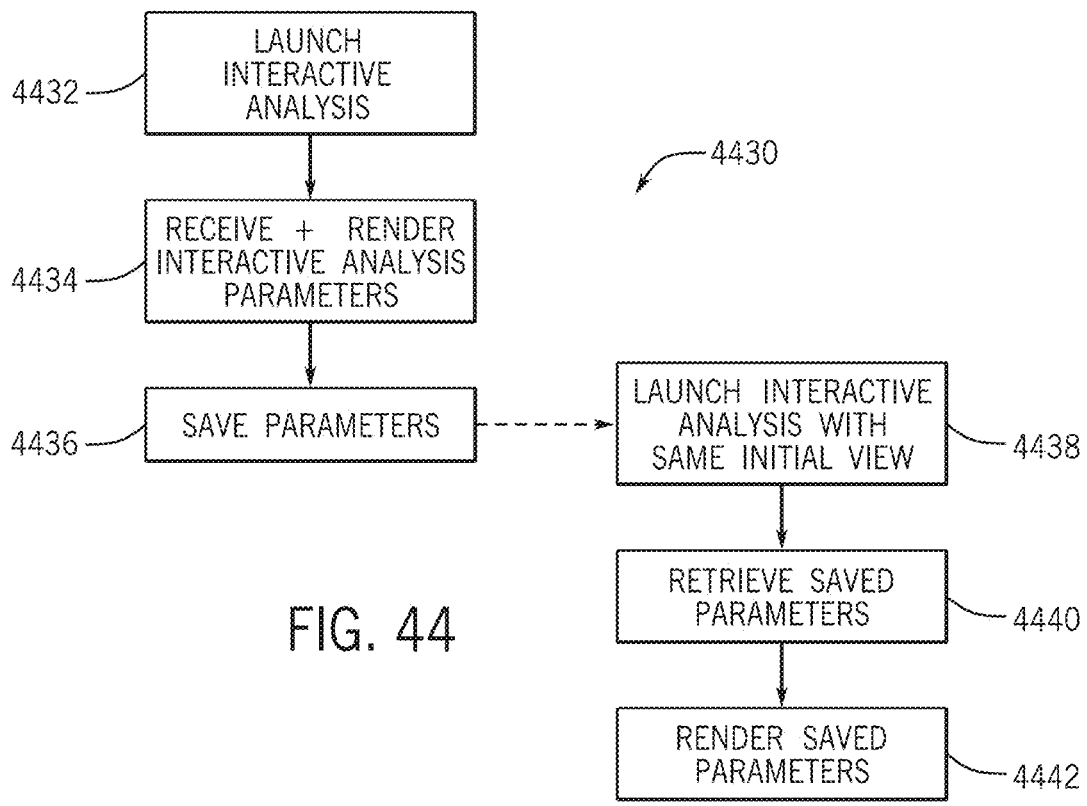
FIG. 44 is a flowchart for a process that enables persistent filter parameters across contextually similar Interactive Analysis sessions, in accordance with an embodiment.

The filter settings (e.g., source filter and/or applied filters) may persist across Interactive Analysis sessions. For example, FIG. 44 is a flowchart illustrating a process 4430 for persisting filter settings in new Interactive Analysis sessions, in accordance with an embodiment. The process 4430 begins by launching a first Interactive Analysis session with a new view (block 4432). For example, as mentioned with regard to the discussion of FIG. 36, a list context may determine a view of the Interactive Analysis session. The list context may be based upon a particular column of data where Interactive Analysis was triggered from (e.g., where a secondary menu of the column triggered a launch of Interactive Analysis).

Upon launch of the Interactive Analysis session, new filtering parameters may be received and rendered (block 4434). For example, as mentioned above, the source filter and/or applied filters may be modified.

As the parameters are modified (or as the Interactive Analysis session ends), the parameters for the particular Interactive Analysis view may be saved (block 4436). For example, the source filter and/or the applied filters for a particular view may be saved to persistent memory.

Upon launch of a new Interactive Analysis session for the same view (e.g., with the same list context) (block 4438), the previous filter parameters are retrieved (block 4440). For example, these settings may be retrieved from the persistent memory based upon a lookup index associated with the list context. The parameters are then rendered in the session (block 4442). Accordingly, the new Interactive Analysis session may appear with the same filter parameters as the previous Interactive Analysis session.

Filter Information Panel

Figure 43:
FIG. 43 is an illustration of filtering in an Interactive Analysis session, in accordance with an embodiment.
Figure 45:
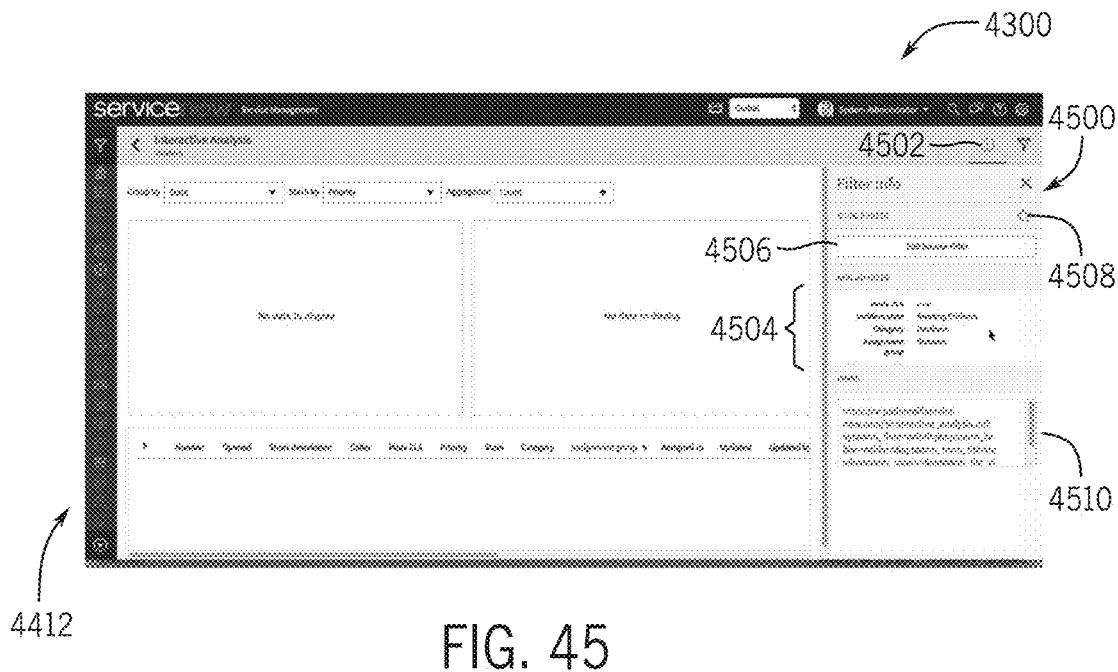
FIG. 45 is an illustration of a GUI of the Interactive Analysis session of FIG. 43, where a Filter Information panel is provided, in accordance with an embodiment.

In some embodiments, a Filter Information Panel may provide an indication of applied filters and/or or facilitate rapid adjustment of filtering information for an Interactive Analysis session. For example, FIG. 43 illustrates an Interactive Analysis session 4300 where a set of filters 4302A, B, and C are applied to the Interactive Analysis session 4300, via the Filter Panel 4304, in accordance with an embodiment. FIG. 45 illustrates an example of a Filter Information Panel 4500, in accordance with an embodiment.

Turning to FIG. 43, as may be appreciated, with the multitude of available data that may be presented in an Interactive Analysis session 4300, quite a few number of filters may be applied to the session 4300. As illustrated, a Status filter 4302A is set to "Awaiting Evidence", a Category filter 4302B is set to "Database", and an Assignment Group filter 4302C is set to "Software". Any number of filters may be applied, creating significant number of filter selectors 4306 and selections of the filter selectors 4306 (e.g., the filters 4302A, B, and C). In some instances, it may be desirable to provide a more-minimal summary of the applied filters, such that a rapid understanding of applied filters may be discerned.

Accordingly, as illustrated in FIG. 45, the Filter Information Panel 4500 may be presented upon a trigger condition (e.g., selection of the Filter Information Panel icon 4502. The Filter Information Panel 4500 may include a line item summary 4504 of the applied filters. By providing each of the applied filters in a single line of a summary, a more rapid understanding of the applied filters may be discerned, when compared with the list of filter selectors 4306 and the set of selections, as illustrated in FIG. 43. For example, as illustrated in FIG. 43, observation of the applied filters may require active scrolling via a scrollbar 4308 to discern each of the applied filters, while the line item summary 4504 does not require scrolling via a scrollbar.

In some embodiments, the Filter Information Panel 4500 may facilitate other filter-related functionality. For example, as illustrated in FIG. 45, the Filter Information Panel 4500 includes an option 4506 to edit the source filter, an option 4508 to save the current filter settings (e.g., all of the Interactive Analysis parameters, the source filter and/or applied filters as a favorite Interactive analysis session parameters), and/or an option 4510 to share the current filter settings (e.g., either by copying to the clipboard, emailing, messaging, etc.). The source filter is a primary filter that filters records to generate a set of source data records to be used by the Interactive Analysis session. The applied filters are filters applied the source data after generation based upon the source filter. Accordingly, the applied filters may be thought of as secondary filters applied after filtering of records using the source filter.

Upon selection of the option 4508, the Interactive Analysis settings to be saved may be saved to a persistent data store and subsequently retrieved (e.g., via an option of the sidebar 4512). Further, upon selection of the option 4510, a uniform resource locator (URL) or other information may be provided for manual selection and copying to the computer's clipboard and/or automatic copy to the computer's clipboard memory, may be populated in an email message, may be populated in another form of electronic message, etc. Thus, other users/computer processes may be provided access to information that allows the other users/computer processes to render the Interactive Analysis session 4300 or another session that shares common filter parameters as the Interactive Analysis session 4300.

When the option 4506 is selected, a Source Filter editing box 4600 may be rendered. The Source Filter editing box 4600 may provide a condition builder 4602 that enables a user to input conditions for the source filter. The condition builder 4602 may pre-populate existing conditions, such as condition 4604 and may enable the user to add new conditions (e.g., via the "New Criteria" option 4606. If the source filter is one that may be used again in the future, the criteria may be saved for subsequent loading by selecting the "Save Filter" icon 4608. A save filter dialog box 4700 may be rendered, enabling the user to select a filter name 4702 and a visibility of the saved filter 4704 (e.g., only to the creator of the saved filter, to everyone, or to a group). In addition, the save filter may include a summary 4706 of the source filter. For example, in FIG. 47, the summary indicates that the source filter is set to an assignment group of "Hardware" based upon selection 4610 for condition 4604 in FIG. 46.

Figure 46:
FIG. 46 is an illustration of a GUI for editing a source filter via the Filter Information Panel of FIG. 45, in accordance with an embodiment.
Figure 47:
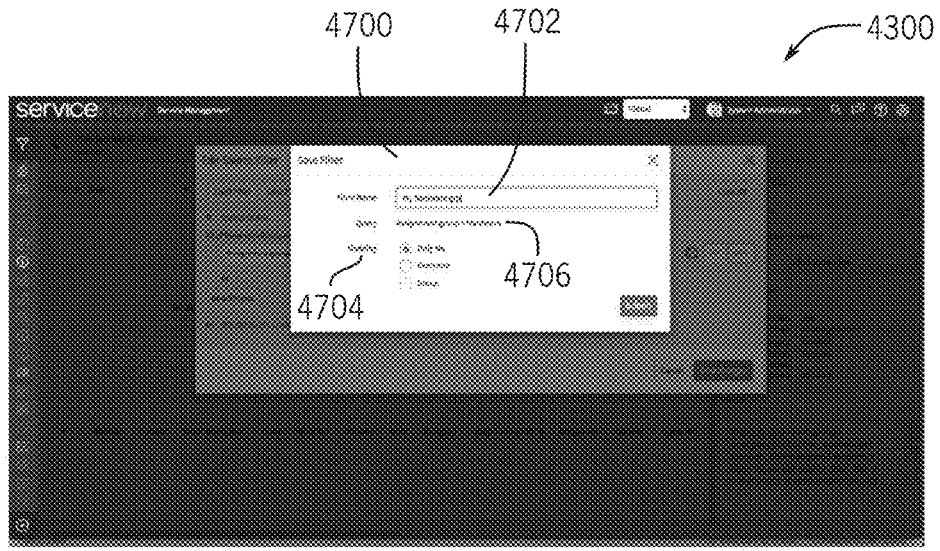
FIG. 47 is an illustration of a GUI for saving a source filter via the Filter Information Panel of FIG. 45, in accordance with an embodiment.
Figure 48:
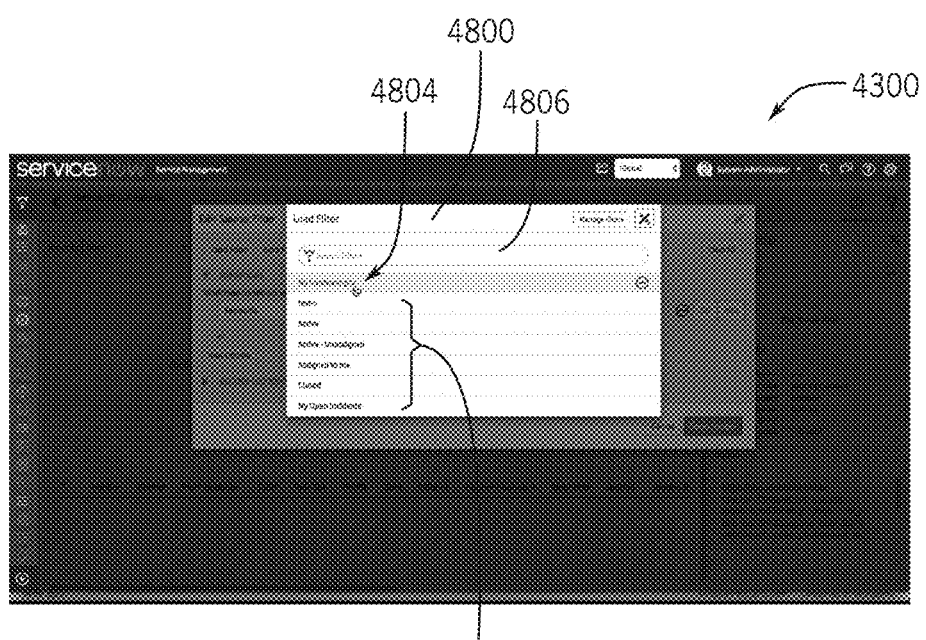
FIG. 48 is an illustration of a GUI for loading saved source filters (e.g., saved via the dialog box of FIG. 47), in accordance with an embodiment.

Saved source filters may be loaded by selecting the Load Filter option 4612 of FIG. 46. FIG. 48 illustrates the rendering of a Load Filter dialog box 4800, upon the selection of the Load Filter option 4612 of FIG. 46, in accordance with an embodiment. The Load Filter dialog box 4800 may include a list 4802 of saved source filters that may be loaded. For example, the "My hardware grp" source filter 4804 is provided in the list 4802. In addition, a text based search filed 4806 may be provided, which provides a text contains query for the names of each of the filters in the list 4802.

The Filter Information Panel 4500 provides ease of use for a multitude of filtering functionalities. Along with providing a rapid line item summary of applied filters, the Filter Information Panel 4500 provide quick access to source filter editing, enabling source filters to be saved and subsequently selected for loading in future sessions. Further, filtering parameters may be shared and may persist across Interactive Analysis sessions.

Data Aggregation

Figure 49:
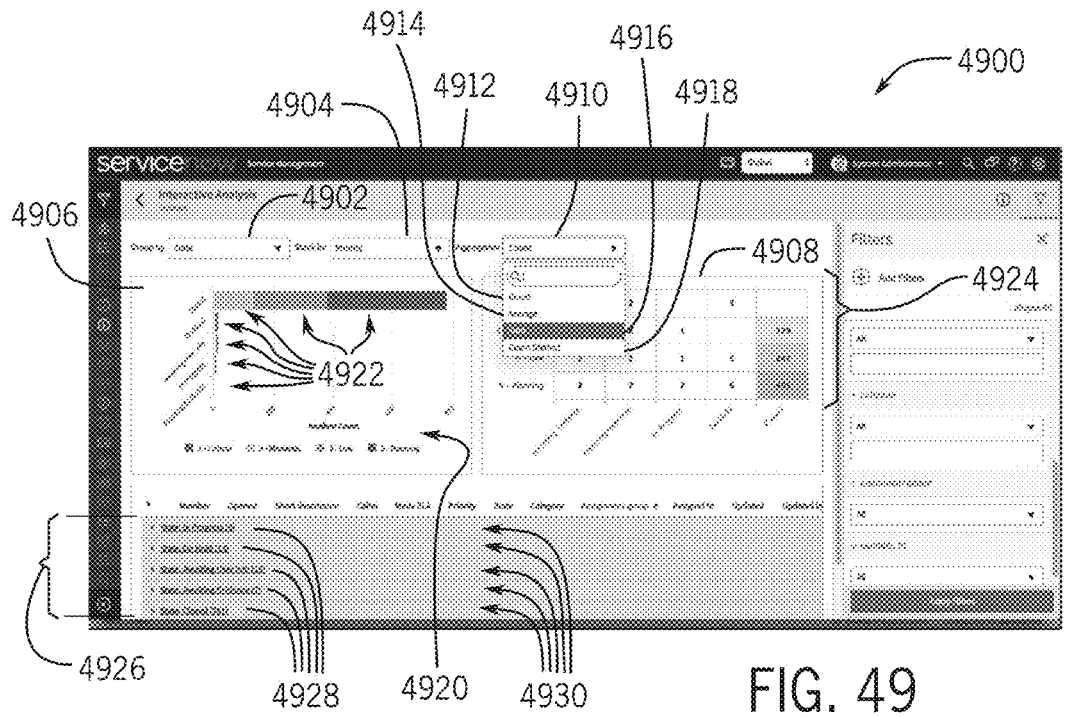
FIG. 49 is an illustration of a GUI for facilitating data aggregation reporting in an Interactive Analysis session, in accordance with an embodiment.
Figure 53:
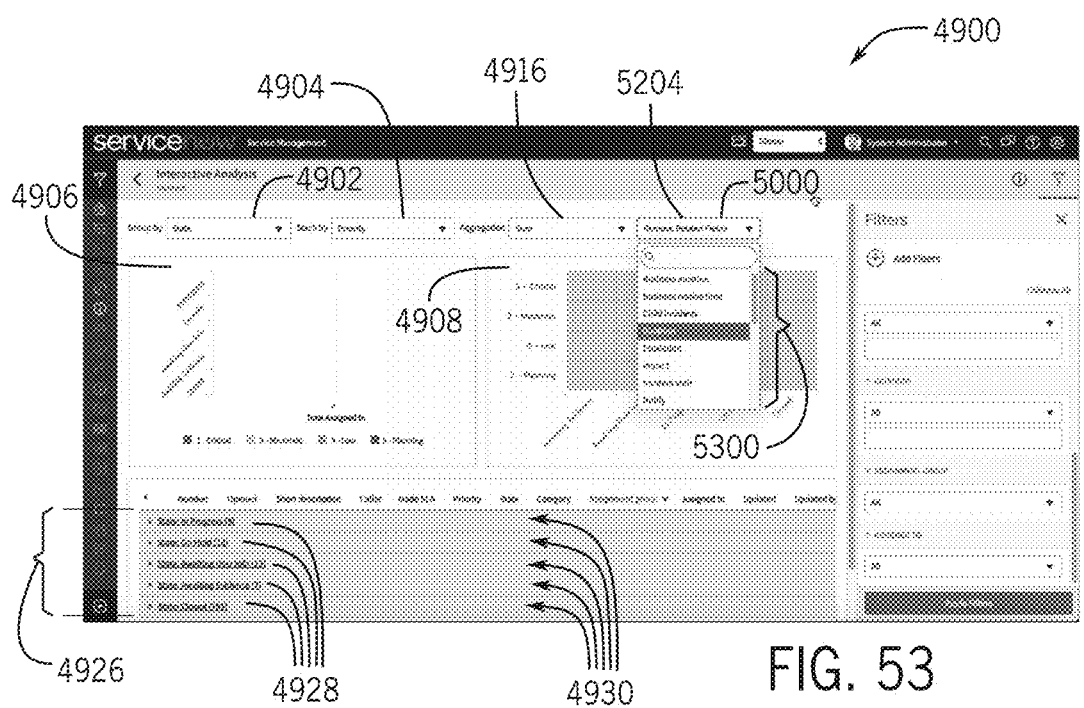
Figure 54:
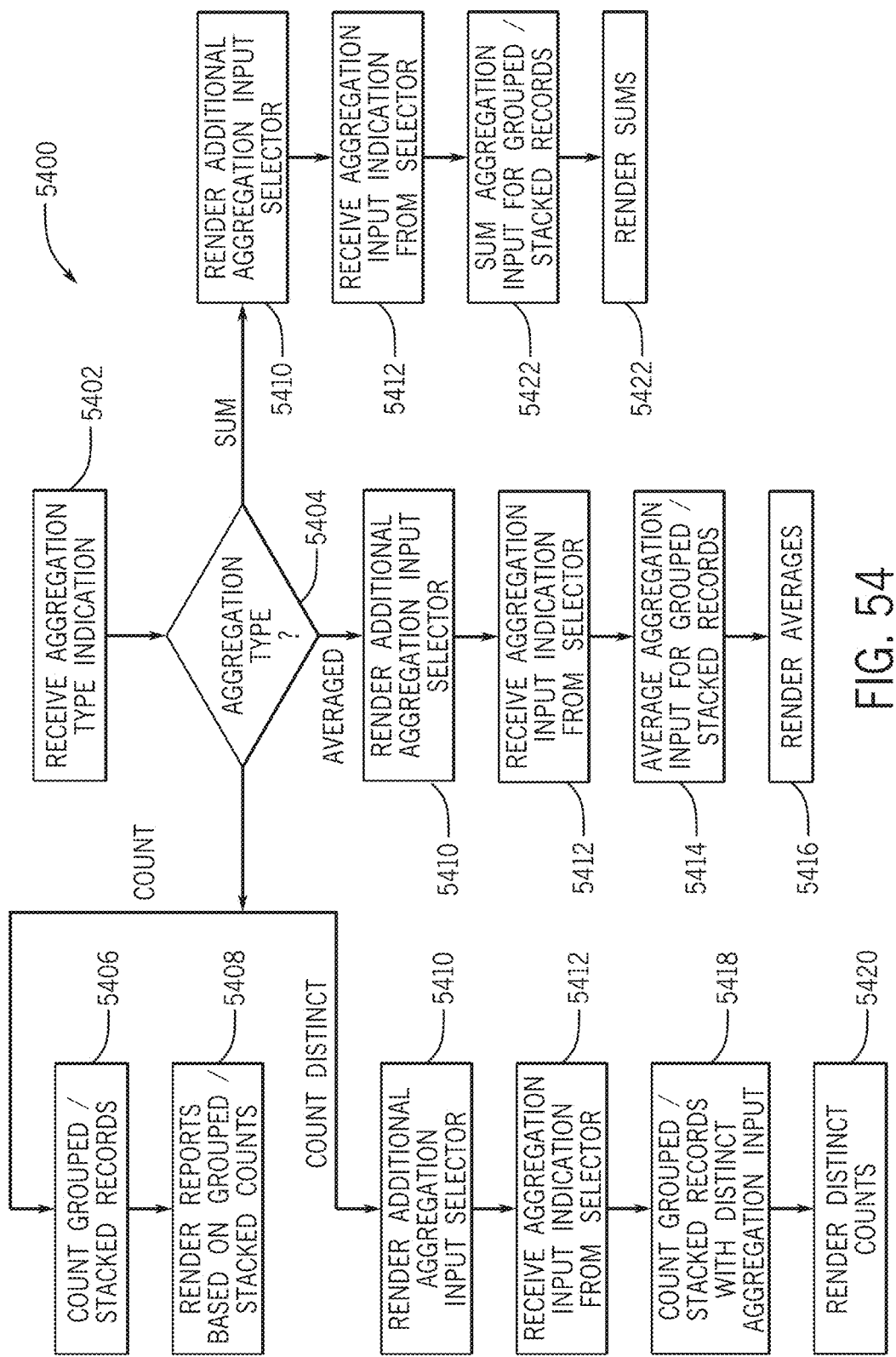
FIG. 54 is a flowchart, illustrating a process for facilitating data aggregation, in accordance with an embodiment.

In some embodiments, the Interactive Analysis session may benefit from additional data aggregation. FIG. 49 illustrates an embodiment of an Interactive Analysis session 4900, where data aggregation features enable complex reporting of data within the Interactive Analysis session 4900, in accordance with an embodiment. FIGS. 50-53 illustrate additional aggregation types applied to the Interactive Analysis session 4900, in accordance with an embodiment. FIG. 54 illustrates a process 5400 for applying data aggregation to an Interactive Analysis session 4900, in accordance with an embodiment.

As discussed above, in an Interactive Analysis session (e.g., session 4900), data records may be grouped and stacked (e.g., according to "Group by" selection 4902 and the "Stack by" selection 4904, respectively). The widgets 4906 and 4908 may reflect this grouping and stacking of records. For example, in the widgets 4906 and 4908, state groupings are provided (e.g., in the Y-Axis of widget 4906 and the X-Axis of widget 4908). Further, the widgets 4906 and 4908 illustrate stacking by priority (e.g., in the color-coding 4920 of widget 4906 and the Y-Axis of widget 4908).

In addition, in some embodiments, different aggregation mechanism may be used in the widget 4906 and 4908 reporting. An aggregation type may be received via the Interactive Analysis session (block 5402). For example, Aggregation selector 4910 may provide aggregation type options for Count 4912, Average 4914, Sum 4916, and Count Distinct 4918. Based upon the aggregation type (decision block 5404), different reporting may be provided in the widgets 4906 and 4908. For example, the Count 4912 may be the default aggregation type selection, resulting in a count of records with common grouped and stacked values, for each of the available grouped and stacked values. Accordingly, a count of records with common "Group by" values and common stacking values may be determined (block 5406). The determined counts may be rendered in the Interactive Analysis session 4900 (block 5408). Thus, in the widget 4906, color-coded counts 4922 are illustrated in a bar graph and record counts 4924 are illustrated in widget 4908.

A "Group by" list of records 4926 may be provided in the Interactive Analysis session 4900, enabling a user to view relevant records. The count aggregation values may be indicated in the list 4926, such as by indicators 4928. By expanding a group, 4930, the grouped records may be exposed.

Some aggregation types may require additional inputs. For example, when Average 4914, Sum 4916, or Count Distinct 4918 are selected, an additional input selector may be rendered (block 5410), enabling a user to provide a specific field for averaging, summing, or for providing a distinct count on.

Figure 50:
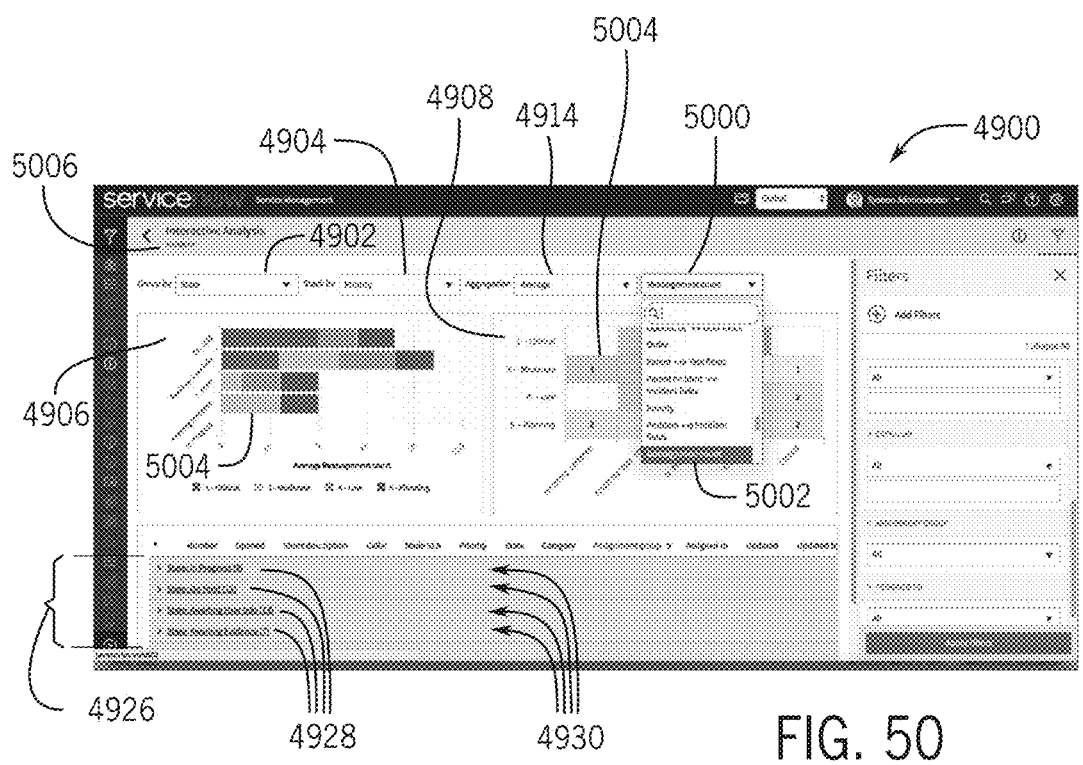
FIG. 50 is an illustration of a GUI for facilitating average aggregation, in accordance with an embodiment.

FIG. 50 illustrates an embodiment of an Interactive Analysis session 4900 where Average 4914 is selected. As illustrated in FIG. 50, an additional aggregation input selector 5000 is rendered, enabling a user to select a particular aggregation field (e.g., for averaging). Options for the input selector 5000 may be determined by identifying a set of tables, columns, or both that have a relationship within a predetermined degree with a table storing the source data. Additionally and/or alternatively, because the options provide an indication of fields whose values are to be aggregated, in some embodiments, the options may be filtered to only those fields that hold numerical values, provide numerical representations, or have particular types of numerical values (e.g., integer, float, etc.).

An aggregation input indication is received via the input selector 5000 (block 5412). In FIG. 50, the user has selected "Reassignment count" 5002 via the aggregation input selector 5000. Based upon this selection, the Interactive Analysis session 4900 determines an average of the values for the selected input from the input selector 5000 for records that have a common "Grouped by" selections 4902 and a common "Stack by" selection 4904 (block 5414). Accordingly, based upon the selections in FIG. 50, an average of reassignment counts for records that have a common state (e.g., the "Grouped by" selection 4902) and a common priority (e.g., the "Stack by" selection 4904.

The Interactive Analysis session 4900 then renders updated widgets 4906 and 4908, each of the widgets 4906 and 4908 rendering the determined averages (block 5416). Thus, based upon the selections of FIG. 50, an average of reassignment counts are rendered via the widgets 4906 and 4908. For example, as illustrated by outputs 5004, the average reassignment count for incident records (e.g., the source filter 5006) that have a state of "Awaiting Evidence" and a priority of "Moderate" is 3.

As mentioned above, a "Group by" list of records 4926 may be provided in the Interactive Analysis session 4900, enabling a user to view relevant records. The count aggregation values may be indicated in the list 4926, such as by indicators 4928. By expanding a group, 4930, the grouped records may be exposed.

Figure 51:
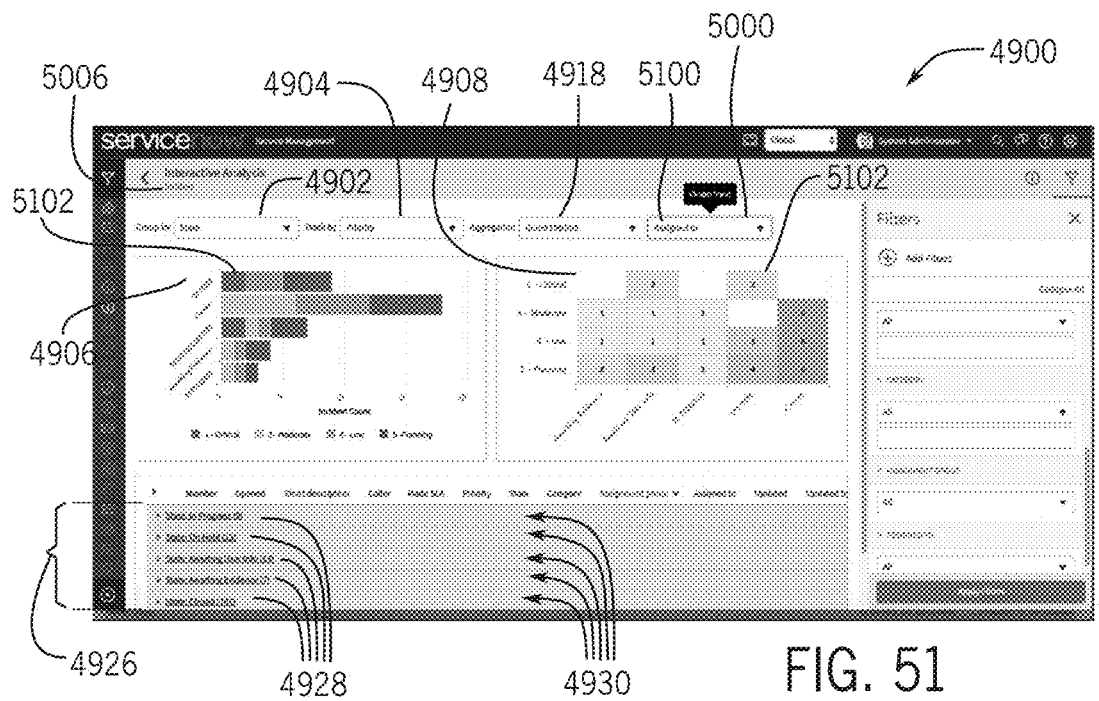
FIG. 51 is an illustration of a GUI for facilitating distinct count aggregation, in accordance with an embodiment.

FIG. 51 illustrates an embodiment of an Interactive Analysis session 4900 where Count Distinct 4918 is selected via the selector 4910. As previously discussed, the supplemental aggregation input 5000 is rendered. Here, the user has selected the "Assigned to" option 5100 as the aggregation input (e.g., via blocks 5410 and 5412 of process 5400). Based upon this selection, the Interactive Analysis session 4900 may identify and count the number of distinct values of the selected field from the input selector 5000 for records with a common "Grouped by "selections 4902 and common "Stack by" selection 4904) (block 5418). For example, a count of distinct "Assigned to" values for records that have a common state (e.g., the "Grouped by" selection 4902) and a common priority (e.g., the "Stack by" selection 4904 is determined. These distinct counts are rendered (block 5420). For example, as illustrated by outputs 5102, the number of distinct values for incident records (e.g., the source filter 5006) that have a state of "On Hold" and a priority of "Critical" is 2.

As mentioned above, a "Group by" list of records 4926 may be provided in the Interactive Analysis session 4900, enabling a user to view relevant records. The count aggregation values may be indicated in the list 4926, such as by indicators 4928. By expanding a group, 4930, the grouped records may be exposed.

Figure 52:
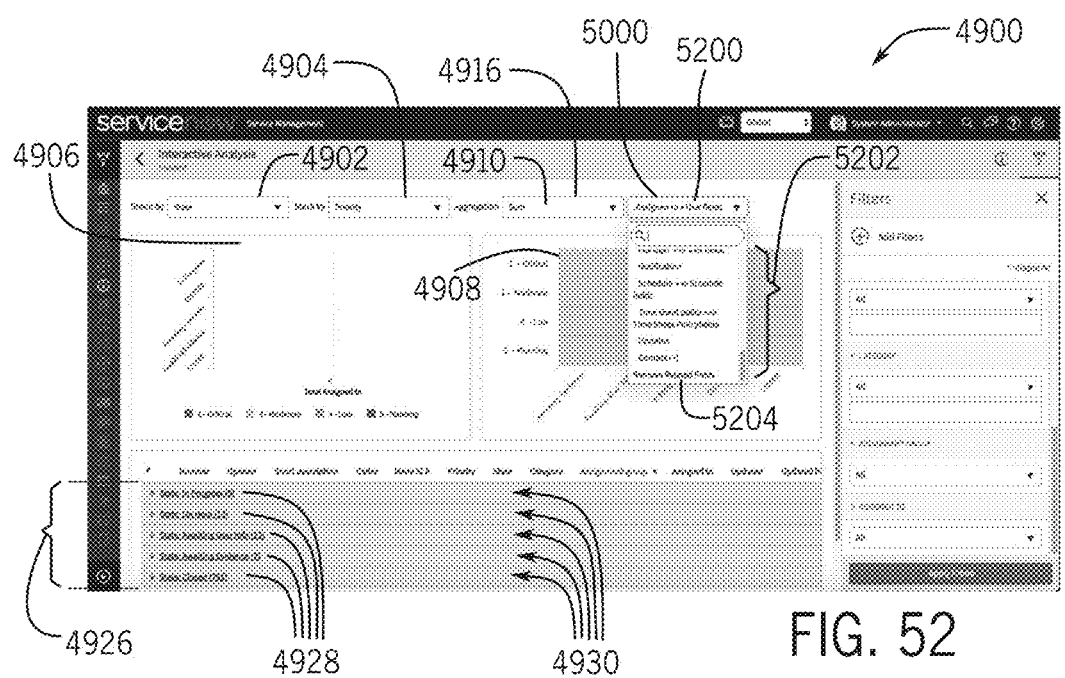
FIGS. 52 and 53 are illustrations of a GUI for facilitating a summation aggregation, in accordance with an embodiment.

FIG. 52 illustrates an embodiment of an Interactive Analysis session 4900 where Sum 4916 is selected via the selector 4910. As previously discussed, the supplemental aggregation input 5000 is rendered (block 5410), where an aggregation input is selected (block 5412). Here, the user has selected the "Assigned to >> User Fields" option 5200 as the aggregation input. The ">>" indicator (or other indicator in the options for the input 5000 may indicate that fields of a related table are being aggregated. Accordingly, with selection of a related fields indicator, field aggregation of a related table may be aggregated and shown, despite not being a part of the source filtered data. These related field options may be used for input 5000 regardless of the type of aggregation.

Based upon this selection, the Interactive Analysis session 4900 may identify and sum a particular user field of a related table for records with a common state (e.g., the "Grouped by" selection 4902) and a common priority (e.g., the "Stack by" selection 4904 (block 5422). For example, any of the user field options 5202 may be selected for aggregation. To remove the related use field options 5202 from the input 5000, the "Remove Related Fields" option 5204 may be selected. For example, as illustrated in FIG. 53, after the "Remove Related Fields" option 5204 is selected. The fields 5300 of the Incident records are once again provided by input 5000. Based upon these selections, the determined summations may be rendered (block 5424) (e.g., via the widgets 4906 and 4908).

As mentioned above, a "Group by" list of records 4926 may be provided in the Interactive Analysis session 4900, enabling a user to view relevant records. The count aggregation values may be indicated in the list 4926, such as by indicators 4928. By expanding a group, 4930, the grouped records may be exposed.

Using the above-described techniques, complex analytics, forecasting, interaction, and/or reporting may be simplified and/or enhanced. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An interactive analysis system, comprising:
a graphical user interface (GUI) configured to provide one or more affordances for selection from the GUI, wherein a first affordance of the one or more affordances enables a first selection of one of a plurality of columns of a data table as a group by selection for grouping source data records and a second affordance of the one or more affordances enables a second selection for stacking the source data records comprising a second one of the plurality of columns of the data table;
a non-transitory memory; and
one or more hardware processors configured to read instructions from the non-transitory memory to perform operations comprising:
identifying source data records from a data store, wherein each of the source data records comprises the plurality of columns of the data table;
performing an interactive analysis based at least on the source data records, the first selection, and the second selection, wherein the interactive analysis is configured to:
group the source data records by the group by selection, the group by selection comprising the first one of the plurality of columns of the data table;
stack the source data records by the stack selection comprising the second one of the plurality of columns of the data table; and
determine an aggregation by aggregating the source data records, which are grouped and stacked, by an aggregation type selection from a plurality of enumerated aggregation type options presented in the GUI, wherein the plurality of enumerated aggregation type options comprise a sum option to aggregate via summation, an average option to aggregate via averaging, a count option to aggregate via counting numerical values, and a count distinct option to aggregate via counting occurrences of distinct numerical values, wherein when the aggregation type is set to perform counts, determine counts for each combination of the source data records with common values for the group by selection and common values for the stack selection;

generating a map of the interactive analysis to display the source data records by the group by selection, wherein the map is stacked based at least on the stack selection and presents the aggregation based upon the aggregation type selection; and generating a heat map of the interactive analysis to display the source data records by the respective priorities, wherein the heat map is generated based at least on the stack selection and presents the aggregation based upon the aggregation type selection.

2. The interactive analysis system of claim 1, wherein the source data records comprise a set of incident records.

3. The interactive analysis system of claim 1, wherein the operations comprise:

selecting a source filter, the source filter configured to define a reduced set of a full set of source data records that satisfy one or more criteria of the source filter; and defining the set of source data records as the reduced set of the full set of source data records.

4. The interactive analysis system of claim 3, wherein the operations comprise:

selecting one or more applied filters;

prior to grouping and stacking the source data records, filtering the source data records to include only a subset of the source data records that satisfy one or more criteria of the one or more applied filters.

5. The interactive analysis system of claim 4, wherein the operations comprise:

receiving an input request to provide a Filter Information Panel; and upon receiving the request, presenting, via the GUI, the Filter Information Panel;

wherein the Filter Information Panel comprises: an option to edit the source filter, a line item summary of each of the one or more applied filters, and an option to share current filter parameters, the group by selection, the stack selection, the aggregation type selection, or any combination thereof, to a clipboard, to a specified role, to a group, to a user, or any combination thereof.

6. The interactive analysis system of claim 4, wherein the operations comprise:

creating an association of a context of the Interactive Analysis with an indication of the source filter and the one or more applied filters; and saving the association, such that subsequent Interactive Analysis sessions with the context may automatically select the source filter and the one or more applied filters.

7. The interactive analysis system of claim 4, wherein the operations comprise:

creating an association of a context of the Interactive Analysis with the group by selection and the stack selection; and saving the association, such that subsequent Interactive Analysis sessions with the context may automatically select the group by selection and the stack selection.

8. The interactive analysis system of claim 4, wherein the operations comprise:

performing the Interactive Analysis, by:

determining whether a prior Interactive Analysis session has occurred with a common context as the Interactive Analysis;

when a prior Interactive Analysis session has occurred, access a previously saved association with the common context and pre-select selections of the previously saved association for the Interactive Analysis.

9. The interactive analysis system of claim 8, wherein the selections comprise: a source filter selection, one or more applied filter selections, a group by selection, a stack selection, or any combination thereof.

10. The interactive analysis system of claim 1, wherein the source data records comprise metric data associated with configuration items.

11. The interactive analysis system of claim 1, wherein the interactive analysis is configured to:

when the aggregation type is set to perform averaging:

render an additional aggregation input selector, the aggregation input selector providing record fields that include numerical values that may be aggregated;

receive an aggregation input selection via the aggregation input selector; and determine averages for the aggregation input selection for each combination of the source data records with common values for the group by selection and common values for the stack selection.

12. The interactive analysis system of claim 1, wherein the interactive analysis is configured to:

when the aggregation type is set to perform distinct counts:

render an additional aggregation input selector, the aggregation input selector providing record fields that include numerical values that may be aggregated;

receive an aggregation input selection via the aggregation input selector; and determine counts of distinct values for the aggregation input selection for each combination of the source data records with common values for the group by selection and common values for the stack selection.

13. The interactive analysis system of claim 1, wherein the interactive analysis is configured to:

when the aggregation type is set to perform summations:

render an additional aggregation input selector, the aggregation input selector providing record fields that include numerical values that may be aggregated;

receive an aggregation input selection via the aggregation input selector; and determine summation values for the aggregation input selection for each combination of the source data records with common values for the group by selection and common values for the stack selection.

14. A tangible, non-transitory, machine-readable medium, comprising machine-readable instructions, configured to:

identify source data records from a data store, wherein each of the source data records comprises a plurality of columns of a data table;

perform an Interactive Analysis based at least on the source data records, wherein the interactive analysis is configured to:

receive, via a graphical user interface (GUI) configured to provide one or more affordances for selection from the GUI:

a first selection of one of the plurality of columns of the data table from a first affordance of the one or more affordances as a group by selection for grouping the source data records; and a second selection of another one of the plurality of columns of the data table from a second affordance of the one or more affordances as a stack selection for stacking the source data records;
group the source data records by a group by selection, the group by selection comprising a first one of the plurality of columns of the data table;
stack the source data records by a stack selection comprising a second one of the plurality of columns of the data table; and
determine an aggregation by aggregating the source data records, which are grouped and stacked, by an aggregation type selection from a plurality of enumerated aggregation type options presented in the GUI, wherein the plurality of enumerated aggregation type options comprise a sum option to aggregate via summation, an average option to aggregate via averaging, a count option to aggregate via counting numerical values, and a count distinct option to aggregate via counting occurrences of distinct numerical values, wherein when the aggregation type is set to perform counts, determine counts for each combination of the source data records with common values for the group by selection and common values for the stack selection;
generate a map of the interactive analysis to display the source data records by the group by selection, wherein the map is stacked based at least on the stack selection and presents the aggregation based upon the aggregation type selection; and
generate a heat map of the interactive analysis to display the source data records by the respective priorities, wherein the heat map is generated based at least on the stack selection and presents the aggregation based upon the aggregation type selection.

15. The machine-readable medium of claim 14, comprising instructions to:
when the aggregation type is set to perform counts, determine counts for each combination of the source data records with common values for the group by selection and common values for the stack selection;
otherwise, when the aggregation type is set to perform averaging:
render an aggregation input selector;
receive an aggregation input selection via the aggregation input selector; and
determine averages for the aggregation input selection for each combination of the source data records with common values for the group by selection and common values for the stack selection;
otherwise, when the aggregation type is set to perform distinct counts:
render the additional aggregation input selector;
receive the aggregation input selection via the aggregation input selector; and
determine counts of distinct values for the aggregation input selection for each combination of the source data records with common values for the group by selection and common values for the stack selection;
otherwise, when the aggregation type is set to perform summations:
render the additional aggregation input selector;
receive the aggregation input selection via the aggregation input selector; and
determine summation values for the aggregation input selection for each combination of the source data records with common values for the group by selection and common values for the stack selection.

16. The machine-readable medium of claim 14, comprising instructions to generate options for the aggregation input selector by:
identifying a set of tables, columns, or both having a relationship within a predetermined degree with a table storing the source data;
identifying a subset of fields of the tables, the columns, or both that are numerical and, thus, capable of aggregation; and
defining the options as the subset of fields.

17. The machine-readable medium of claim 14, comprising instructions to present, via a graphical user interface (GUI), a Filter Information Panel that provides an option to edit the source filter, a line item summary of each of the one or more applied filters, and an option to share current filter parameters, the group by selection, the stack selection, the aggregation type selection, or any combination thereof, to a clipboard, to a specified role, to a group, to a user, or any combination thereof.

18. A method, comprising:
identifying source data records from a data store, wherein each of the source data records comprises a plurality of columns of a data table;
performing an Interactive Analysis based at least on the source data records, wherein the interactive analysis is configured to:
receive, via a graphical user interface (GUI) configured to provide one or more affordances for selection from the GUI:
a first selection of one of the plurality of columns of the data table from a first affordance of the one or more affordances as a group by selection for grouping the source data records; and
a second selection of another one of the plurality of columns of the data table from a second affordance of the one or more affordances as a stack selection for stacking the source data records;
group the source data records by a group by selection, the group by selection comprising a first one of the plurality of columns of the data table;
stack the source data records by a stack selection comprising a second one of the plurality of columns of the data table; and
determine an aggregation by aggregating the source data records, which are grouped and stacked, by an aggregation type selection from a plurality of enumerated aggregation type options presented in the GUI, wherein the plurality of enumerated aggregation type options comprise a sum option to aggregate via summation, an average option to aggregate via averaging, a count option to aggregate via counting numerical values, and a count distinct option to aggregate via counting occurrences of distinct numerical values, wherein when the aggregation type is set to perform counts, determine counts for each combination of the source data records with common values for the group by selection and common values for the stack selection;
generating a map of the interactive analysis to display the source data records by the group by selection, wherein the map is stacked based at least on the stack selection and presents the aggregation based upon the aggregation type selection; and
generating a heat map of the interactive analysis to display the source data records by the respective priorities, wherein the heat map is generated based at least on the stack selection and presents the aggregation based upon the aggregation type selection.

19. The method of claim 18, wherein a source filter, an applied filter, the group by selection, the stack selection, the aggregation type selection, or any combination thereof is persisted across Interactive Analysis sessions with a common context.

* * * * *